United States Patent [19]

Merkin

[11] Patent Number: 5,715,463
[45] Date of Patent: Feb. 3, 1998

[54] INSTALLATION UTILITY FOR DEVICE DRIVERS AND UTILITY PROGRAMS

[75] Inventor: Cynthia M. Merkin, Lake Worth, Fla.

[73] Assignee: International Business Machines Corporation, Armonk, N.Y.

[21] Appl. No.: 861,220

[22] Filed: Mar. 31, 1992

[51] Int. Cl.$^6$ .................................................. G06F 9/445
[52] U.S. Cl. ........................................ 395/712; 395/651
[58] Field of Search .................................. 395/700, 500, 395/712, 651, 653

[56] References Cited

U.S. PATENT DOCUMENTS 5,247,687  9/1993  Holmes et al. ...................... 395/700

OTHER PUBLICATIONS

Mastering Windows 3.1, R. Cowart, Sybex, 1992, pp. 188–193, 202–204, 124–125, 174–177.
Operating Systems: A Systematic View, W.S. Davis, Addison–Wesley Publishing Company, May, 1987, pp. 19, 25–26.
IBM Operating System/2™ Programming Tools and Information Version 1.2, I/O Subsystems and Device Support, vol. 1, Device Drivers, pp. vi, 2–1—2–3.

*Primary Examiner*—Kevin A. Kriess
*Assistant Examiner*—Kakali Chaki
*Attorney, Agent, or Firm*—Mark S. Walker; Andrew J. Dillon

[57] ABSTRACT

An improved method of installing device drivers or utility programs on a data processing system is disclosed. Provided are a plurality of command specifications relating to installation operations for the device drivers or the utility programs. Installation programs on media introduced to an auxiliary memory units are identified, wherein the program include statement instances invoking selected command specifications. A list of the identified installation programs is built and the selected command specifications invoked by the statement instances called. Executing the command specification returns interpretable code for the installation programs. Upon running the installation program the interpretable code is interpreted.

7 Claims, 27 Drawing Sheets

INSTALLATION UTILITY FOR DEVICE DRIVERS AND UTILITY PROGRAMS

BACKGROUND OF THE INVENTION

1. Technical Field

The invention relates to installation of device drivers and utility programs onto data processing systems and more particularly relates to providing a system for generating installation scripts for device drivers and a parsing routine of general applicability to the installation scripts to support installation of a device driver.

2. Description of the Related Art

Essential to the practical usefulness of a computer is provision in the computer of mechanisms for the transfer of information between the data processing and manipulation components of the computer and the input/output ("I/O") devices attached to the computer. Among the common I/O devices are asynchronous communications devices, floppy disk drive units, hard disk drive units, keyboards, mouses, printers, programmable interrupt controllers, timers and video generators. I/O devices provide essentially the exclusive vehicles for the loading of programs and data onto computer systems, for display of the results to users and for providing communications between computers.

Device drivers provide for conversion of the generalized expression of data on a computer into or from formats usable by the I/O device. Device drivers are an installable component of an operating system which interact with I/O devices and which buffer the remainder of the operating system from the characteristics of the device driver. The device driver is a program and acts upon or sets various buffers, control bits, flags, registers and status bits necessary for I/O device operation. Each device has a device driver.

Stemming from the frequent availability of new products for I/O operation, and from the continuing improvement of existing devices, users occasionally wish to provide their computers with new or improved input and output capabilities made possible by the developments. Doing so requires installation or update of drivers in the operating system of the computer. To that end, developers of I/O devices deliver with their product a floppy disk or diskette on which is recorded a device driver program for the product. However, for a variety of reasons, no standard method exists for transferring the device driver program from the floppy disk onto the computer's hard disk drive. This in part stems from the highly customized nature of most drivers and the difficulty of anticipating, in a hypothetical standard install utility program, all of the desired points of interaction between the device driver and the file management portion of the operating system along with associated error recovery.

The necessity of unique installation programs for each device driver has other undesirable consequences. Installation of drivers is in essence, never the same thing twice. Development of installation programs by employees of device developers is also a distraction. Installation programs are essentially. throwaway commodities, never to be used after installation of the device driver. None-the-less, they are important part of the product in terms of ease of use.

One prior partial solution to the problem was the DDIN-STALL feature of the OS/2 operating system. However, DDINSTALL provided no user interface, no way of treating conditional features of installation and no user exit control. DDINSTALL operated only to copy a file and to add a line to the CONFIG.SYS file of the operating system. DDIN-STALL provided only two tags for the use of install script developers in preparing device data profiles.

SUMMARY OF THE INVENTION

It is therefore one object of the invention to provide a more efficient system and method for the installation or update of device drivers and utility programs on data processing systems.

It is another object of the invention to provide a system and method for generating installation data profiles utilized as inputs to a general application installation utility.

It is yet another object of the invention to provide a common user interface for utilization in installation device drivers and utility programs.

The foregoing objects are achieved as is now described. An improved method of installing device drivers or utility programs on a data processing system is provided by defining a plurality of command specifications relating to installation operations for device drivers and utility programs. Installation programs on media introduced to an auxiliary memory unit are identified, wherein the programs include statement instances invoking selected command specifications. A list of the identified installation programs is built and the selected command specifications invoked by the statement instances called. Executing the command specifications return interpretable code for the installation programs. Upon running the installation program the interpretable code is interpreted.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
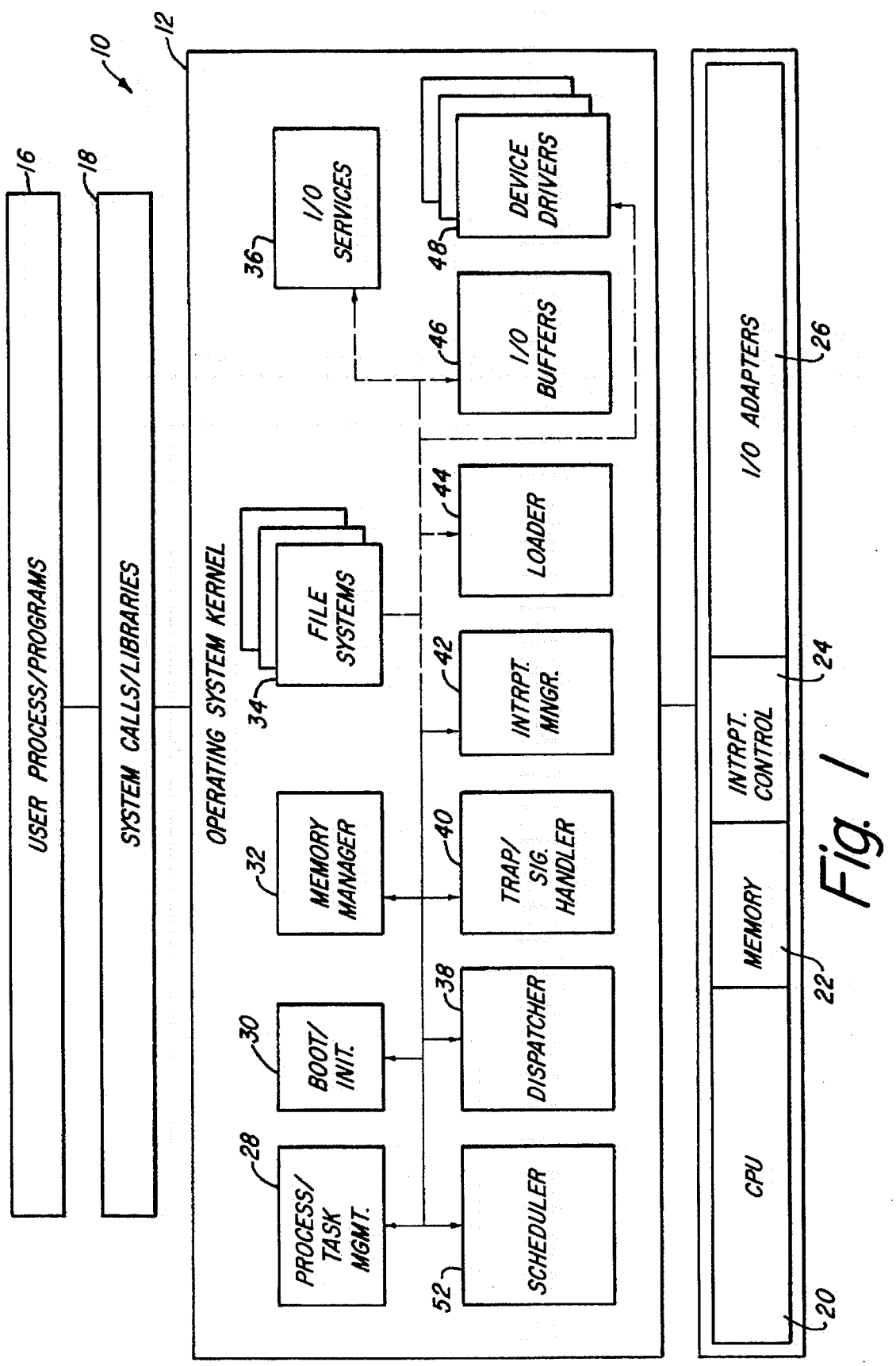
FIG. 1 is a high level block diagram illustrating software and hardware components of a data processing system which may be utilized to implement the method and system of the present invention.
Figure 2A:
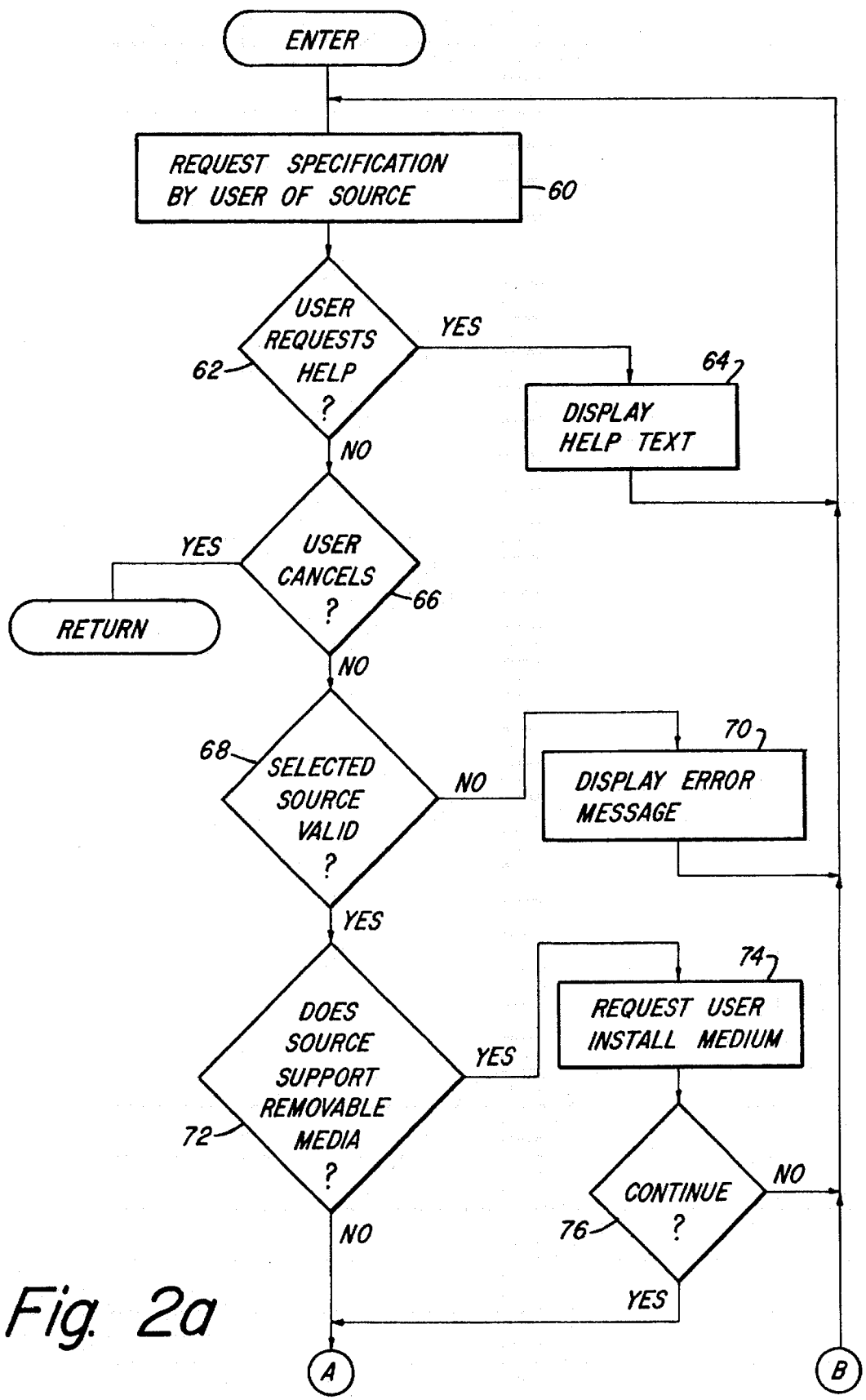
FIGS. 2a–2d are high level logical flow charts illustrating the method and system of the present invention.
Figure 2B:
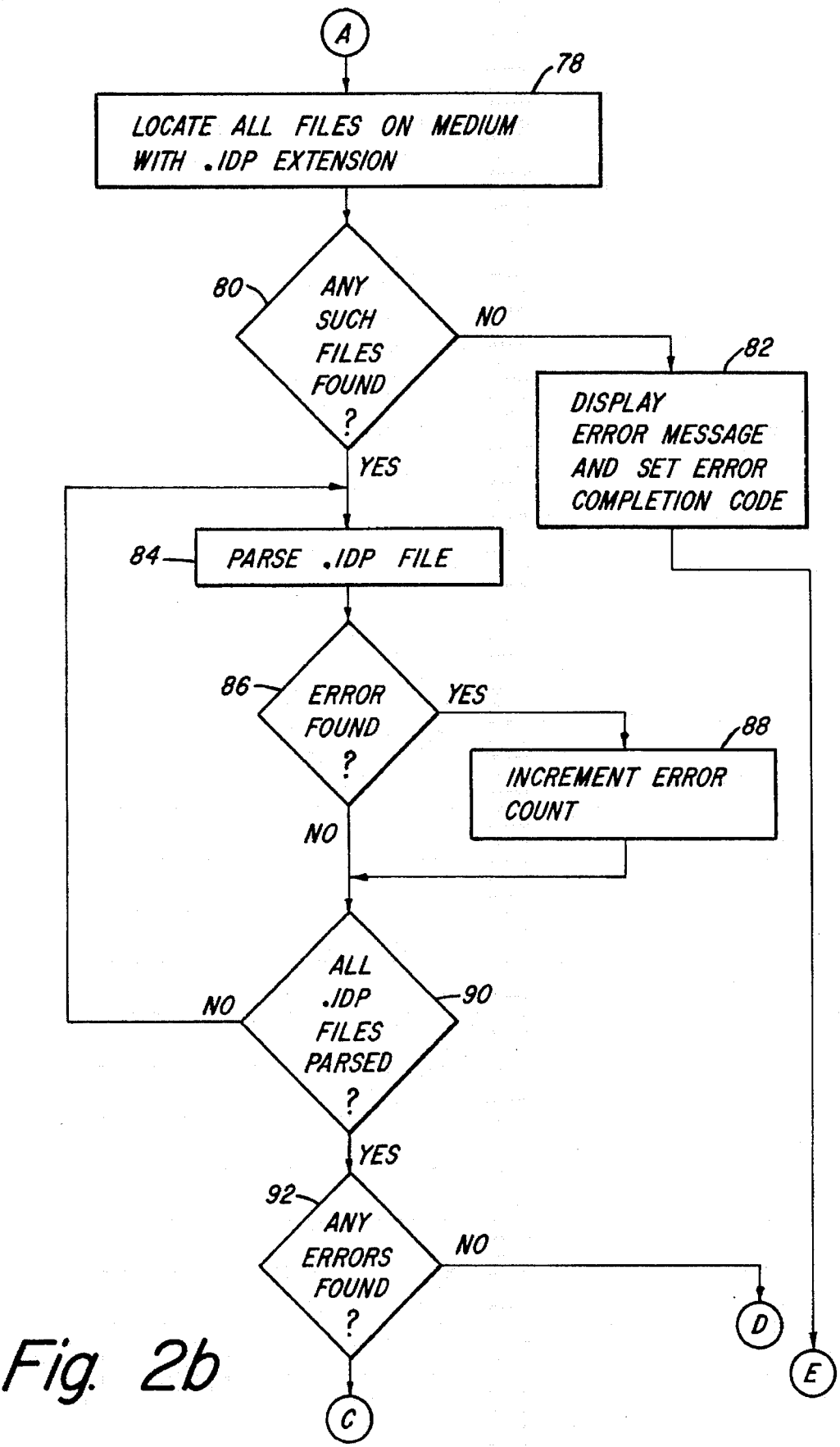
Figure 2C:
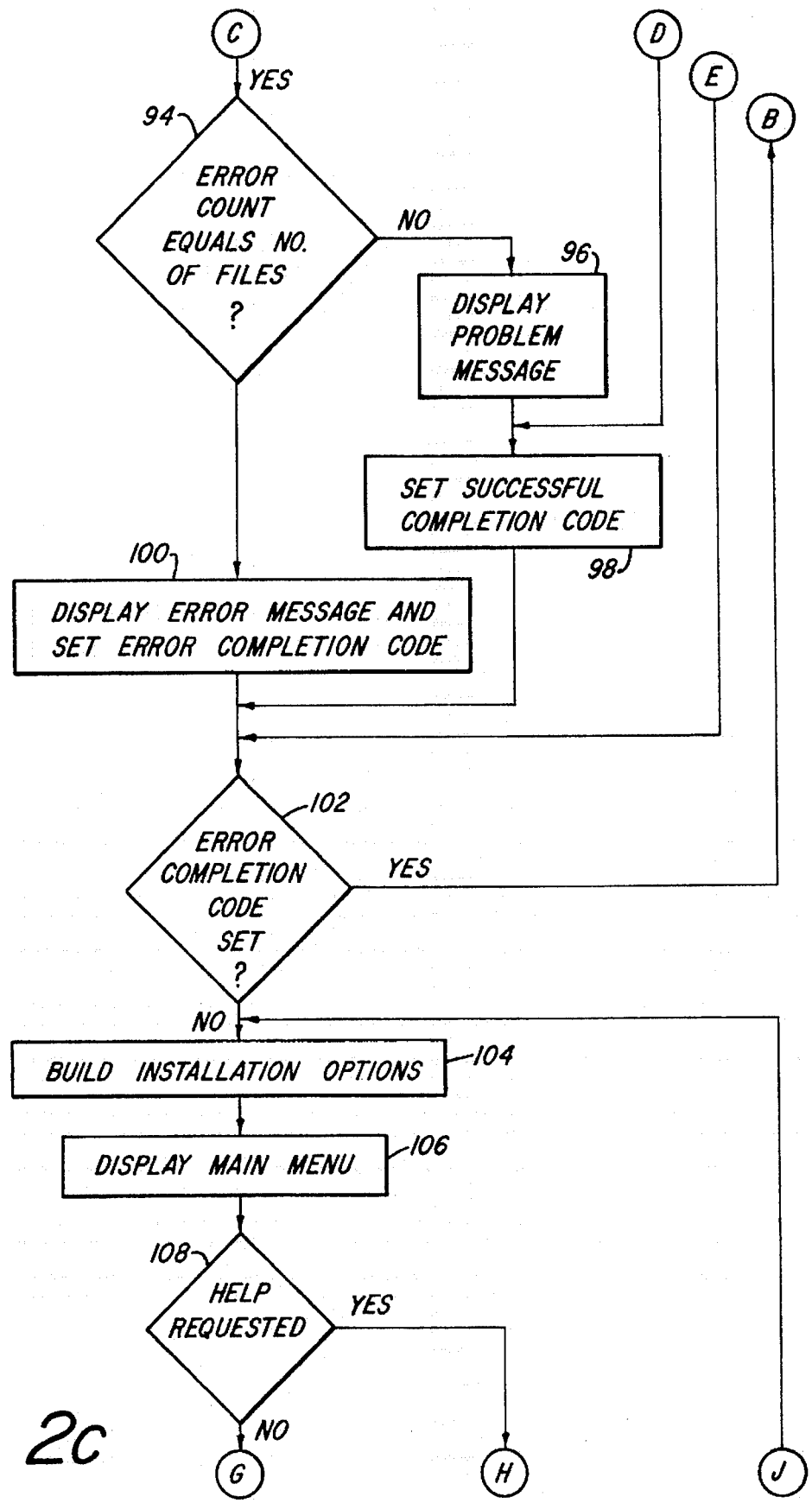
Figure 2D:
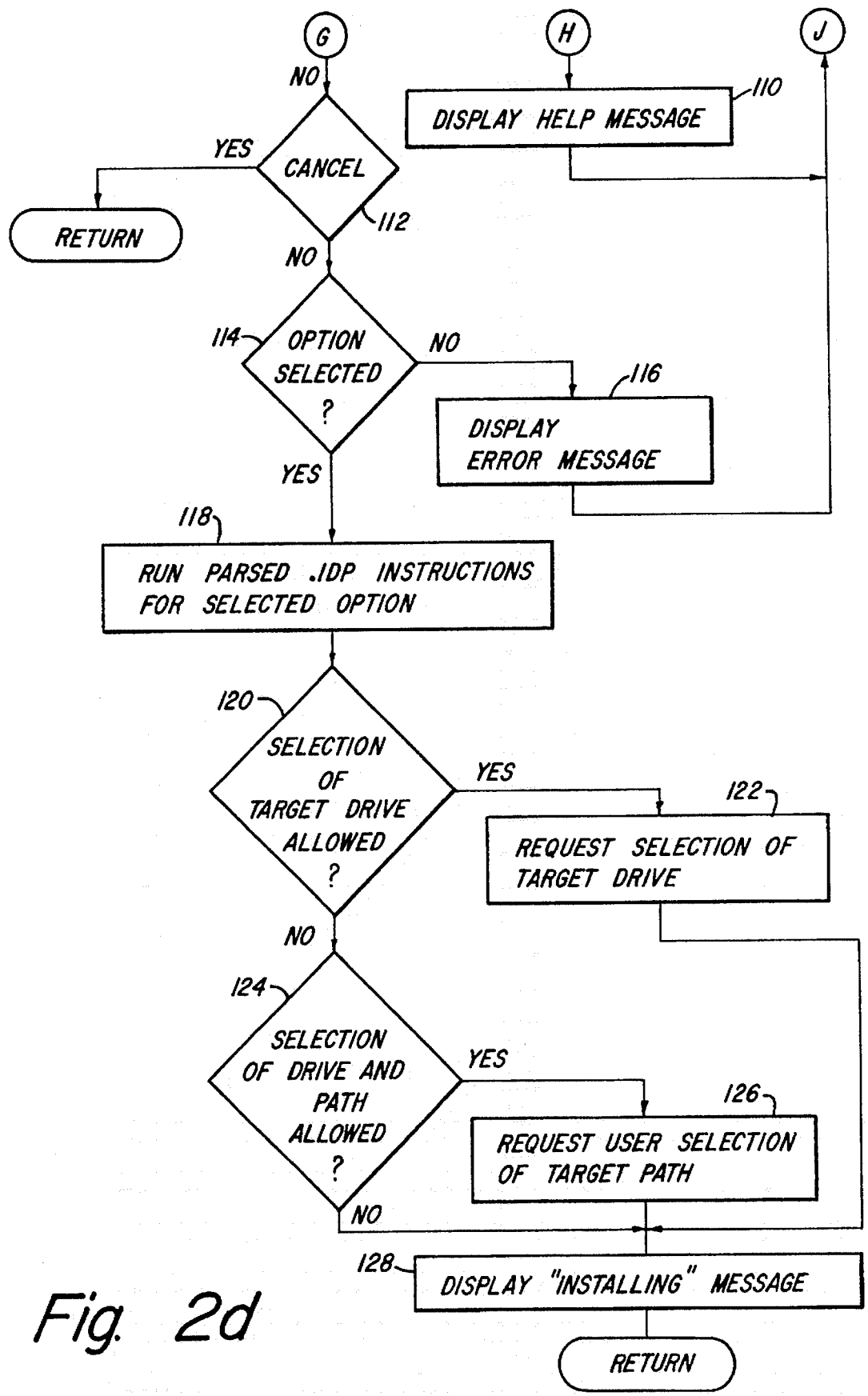

With reference now to the figures and in particular with reference to FIG. 1, there is depicted a high level block diagram illustrating software and hardware components of a data processing system 10 which may be utilized to implement the method and system of the present invention. Data processing system 10 includes an operating system kernel 12 which resides in a hardware system 14. The operating system is preferably provided by a disk operating system such as MS-DOS® version 3.3 or later available from Microsoft Corporation or the OS/2® operating system available from International Business Machines Corporation. Hardware system 14 includes at minimum a central processing unit (CPU) 20 and a computer memory 22. Hardware system 14 further preferably includes an interrupt controller 24 and input/output adapters 26.

Also depicted in FIG. 1 are user processes/programs 16 which, in a manner well known to those skilled in the art, access selected procedures within operating system kernel 12 by means of system calls which are depicted at reference numeral 18. As is typical in such systems selected procedures within operating system kernel 12 are designed to be called or invoked by applications within data processing system 10 and thereafter the task will return to the user program which invoked the operating system kernel procedure. In this manner, operating system kernel 12 acts as an interface between the user of data processing system 10 and hardware system 14.

Operating system kernel 12 is utilized to provide an environment in which various processes or programs may be executed. Operating system kernel 12 provides for the efficient utilization and prevents user application programs from interfering with the proper operation of data processing system 10 by controlling the creation and alteration of files, the control of input/output devices and the provision of multiple device drivers which permits data processing system 10 to interface with various external devices.

Still referring to FIG. 1, it may be seen that operating system kernel 12 includes multiple subsystems, including process/task management system 28 which is utilized to provide task creation, deletion, status and synchronization functions. Boot/initialization system 30 typically is embodied in microcode in non-addressable memory and is utilized to load the operating system into computer memory 22.

Next, memory management system 34 is depicted. Memory management system 32 allocates and deallocates portions of computer memory 22 for data processing system 10. File systems 34 are preferably utilized to control the creation and deletion of files. A file is simply a named set of records stored or processed as a unit by a data processing system. Another aspect of files typically addressed within an operating system kernel is control of access to the files. Access control is utilized to ensure that an access to a file or directory is checked for correctness. Next, input/output services system 36 is depicted. Input/output services system 36 is preferably a functional unit within operating system kernel 12 which controls peripheral hardware.

Next, dispatcher 38 is depicted within operating system kernel 12. Dispatcher 38 places jobs or tasks into execution. Dispatcher 38 is thus responsible for providing multi-tasking and operates in conjunction with a scheduler to implement a particular type of scheduling system.

Trap and signal handler 40 is also depicted within operating system kernel 12 and is utilized to respond to traps and signals typically activated by hardware system 14. Among the signals generated by hardware 14 are page fault signals indicated operations relating to computer memory 22 and auxiliary memory accessed through I/O adapters 26. Such page fault signals are subdivided into two categories corresponding to the type of memory being accessed. Page reclaim operations relate to a memory paging operation limited to computer memory 11. A page fault requiring I/O operations is the second category. Any auxiliary memory operation requires a relatively large amount of time to execute compared to central processor operation and page reclaims.

Interrupt manager 42 preferably manages interrupt handlers which are set up by the operating system kernel 12 and kernel extensions to take whatever action is necessary to respond to the occurrence of an interrupt. Loader system 44 is also depicted within operating system kernel 12 and, as those skilled in the art appreciate, is typically a routine which loads programs, libraries and kernel extensions. Input/output buffers 46 are depicted within operating system kernel 12 are utilized to temporarily store data during transfer from one hardware device to another in order to compensate for possible differences in data flow rate.

A plurality of device drivers 48 are depicted. Device drivers 48 are typically utilized to attach and use various peripheral devices which may be coupled to data processing system 10. For example, displays, keyboards, printers, floppy disk drives, fixed disk drives and other auxiliary devices are typically controlled from data processing system 10 utilizing a device driver associated with the particular auxiliary device selected for control. Device drivers 48 are installable and operating system kernel 12 is adapted to admit additional and utilize additional units.

Next, scheduler 52 is depicted. Scheduler 52 orders specific tasks for dispatch to the processor upon indication that a task is "ready to run". Good design of the scheduling algorithm provides both effective use of central processing unit 20 by the various tasks and smooth response to user requests of data processing system 10.

The system and method of the present invention allow developers of device drivers to supply an installation script identified by the DOS file name extension ".IDP". An IDP file is an installation data profile providing an installation script written in tags having some resemblance to the tags in generalized markup language. The tags specify the installation functions to be performed. The installation data profile also contains information to be used by the method and system of the present invention for supporting menu related functions, a one line description of the function being installed and help text for use with installation. The general installation program provided by the system and method of the invention reads all files with the extension IDP and presents the user with a menu of installation choices supported by the installation data profiles available from the supplier of the device driver.

FIG. 2 depicts a high level flowchart of the general installation utility called through operating system 12. The utility is a customizable installation command interpreter. Customization is provided by the installation data profiles. The process is entered at step 60 with display of a request to the user to specify a source disk drive in which the device driver program is to be found. The request to the user will be displayed on a video monitor by way of a window in which a line is provided for entry of a source drive and which will provide the user with three options. A first option is utilized after specification of a source disk drive to indicate continuation with installation. A second option allows the user the cancel installation. A third option allows the user to display additional help text material explaining more fully the function of the utility. After step 60, the process executes a series of decision blocks, 62, 66 and 68 to determine the choice made by the user. At step 62, the process determines if the user requested help. The YES branch from step 62 results in execution of step 64, the display of the help text. The help text will remain displayed until the user toggles the HELP key to return to step 60 for redisplay of the window requesting the specification of a source drive. The NO branch from step 62 indicates the user requested no help and results in execution of step 66, where it is determined if the user has cancelled the process. The YES branch from step 66 results in termination of the process and return of the process to the program from which the install program was called, for example a DOS command line interface. The NO branch from step 66 advances the process to step 68 where it is determined if a valid source has been specified for a source drive. Absence of any selection, or designation of a drive letter for a drive which does not exist, results at step 70 in display of an error message and the return of processing to step 60 for redesignation of a possible source.

After selection of a valid potential source, step 72 is executed to determine if the source supports a removable medium. Typically, a device driver and installation data profile will be provided on a 5¼ inch floppy disk or on a 3½ inch diskette which may be inserted into or removed from an appropriate capacity floppy disk or diskette drive unit. Upon determination that the source supports removable medium, step 74 is executed to display a message to the user to request installation of the medium, such as a floppy disk. The user at step 76 may elect to continue or discontinue the process. For example, a user may discover at this point that the installation data profile has been supplied on a 3½ inch disk and that the user has specified a 5¼ inch drive. In such a situation, the user would have to request specification of a different source. Thus the user may elect not to continue the process. This results in termination of the process and return to the calling process.

If the source does not support removable medium, or the user has installed a medium in an appropriate source and elected to continue the process, step 78 is executed. All files on the medium having the .IDP extension are located and a list of such files is constructed. At step 80, it is determined if any files having the .IDP extension were located. If none were, at step 82 an error message is displayed and an error completion code is set. Processing then skips to step 102 where the setting of the error completion code is detected resulting in discontinuation of the process with return to step 60. Assuming such files where found, step 84 is executed wherein the first installation data profile file from the list generated at step 78 is parsed. If an indication of error is returned from parsing of a file, it is detected at step 86 and an error count is incremented at step 88. At step 90, it is determined if all files from the list built at step 78 have been parsed. If not, the process returns to step 84 for parsing of the next file from the list. Steps 84–90 are executed in a loop until all installation data profile files have been parsed. Completion of the loop also returns two numbers, one being the number of files and the second being the number of files containing error. The file parsing operation returns pseudo code for each successfully parsed file which, upon actual installation, may be interpreted by a run-time interpreter to produce the sequence of commands required for actual installation of a device driver.

Upon parsing of all installation profile files, step 92 is executed to determine if any errors were found, i.e. if the error count is nonzero. If no errors were found, step 98 is executed to set a successful completion code set. If errors were located, the YES branch from step 92 leads to decision block 94 were it is determined if the error count equals the number of installation data profiles. If the counts are equal, all of the files contained error. Step 100 is executed resulting in display of an error message indicating absence of any valid IDP files on the source and the error completion code is set. If the error count does not equal the number of files, i.e. the number of files containing error is less than the total number of files, step 96 is executed resulting in display of a problem message indicating the situation to the user, and subsequent execution of step 98 wherein a successful completion code set is set. From step 98 or step 100, it is determined if the error completion code was set at step 102. If no valid installation data profiles are present, operation of the process will be returned to step 60 to allow the user to take correcting steps. If valid installation data profiles are present however, the process continues to step 104.

At steps 104 and 106, the installation options available are constructed and displayed to the user in a menu. Again, the user is presented three options at this point, to request help, to cancel the installation or to select an option. The user selection is detected by execution of a series of decision blocks represented by steps 108, 112 and 114. If help is requested, the request is detected at step 108 resulting in execution of step 110 where the available help text is displayed and return of the process to step 104 to redisplay the installation options. Cancellation of operation is detected at step 112 resulting in return of processing to the calling program. At step 114, it is determined if an option has been specified. This step is necessary to allow for accidental depression of the ENTER button displayed in the menu of step 106 prior to selection of an option. If no valid option has been selected an error message is displayed at step 116 and the process is returned to step 104 for redisplay of the installation options.

The help text displayed by step 110 will be provided by the author of the installation data profile. Through such help text the developers of the device driver may provide explanation of the options presented such as their effects on operation of the operating system or reasons for installation of a device driver on a particular drive.

At step 118, upon selection of an option, the appropriate parsed installation data profile for the selected option is run. This step includes a conventional interpreter operation which translates each line of pseudo code generated in the prior parsing operation into executable code for the computer. The installation data profile may include several conditional operations allowing for user input. Among such options might be selection of a target drive or selection of a path and drive for the device driver. Where selection of a target is allowed it will be detected at step 120 resulting in display of a request for selection of a target drive at step 122. If the author has chosen to allow selection of a target path and drive, it will be detected at step 124 resulting in display of a request to the user for selection of a target path at step 126. Steps 120, 122, 124 and 126 are exemplary of conditional options which may be introduced to the overall process through an installation data profile. The steps are not an essential part of the installation utility, but rather are introduced to the program by the data profiles. Upon selection of a target drive or target path, if so provided, installation of the device driver will continue and a message will be displayed to the user indicating such installation is proceeding. Such installation will include copying of the device driver into the appropriate path as specified by the profile or as selected by the user and will conclude with return of the process to the calling program.

The parsing operation of step 84 is a critical aspect of the system and method of the present invention. Fifteen command functions are defined by the installation language. Installation scripts written using this language and conforming to parameter specifications associated with various of the command functions can be handled by the process parser to produce near executable code. The tags for the command functions and their names are produced below in Table 1:

TABLE 1

| ":COPY", | ParseCopy |
| ":LI", | ParseLineIns |
| ":UPDATE", | ParseUpdate |
| ":EUPDATE", | ParseUpdateEnd |
| ":TXT", | ParseTxt |
| ":ETXT", | ParseTxtEnd |
| ":MSG", | ParseMsg |
| ":IF", | ParseIf |
| ":ELSE", | ParseElse |
| ":EIF", | ParseEndIf |
| ":RUN", | ParseRun |
| ":CANCEL", | ParseCancel |
| ":INSTALL", | ParseInstall |
| ":EINSTALL", | ParseInstallEnd |
| ":HELP", | ParseHelp |

The subroutine invoked by each command function is elaborated upon below with reference to flowcharts depicted in FIG. 4–18. Each of the installation data profile files present on the installation source medium is parsed into pseudo code. The parsing function builds a list of all installation data profile files present on the installation source drive and tokenizes the ASCII character data sets into run-time structures.

Figure 3A:
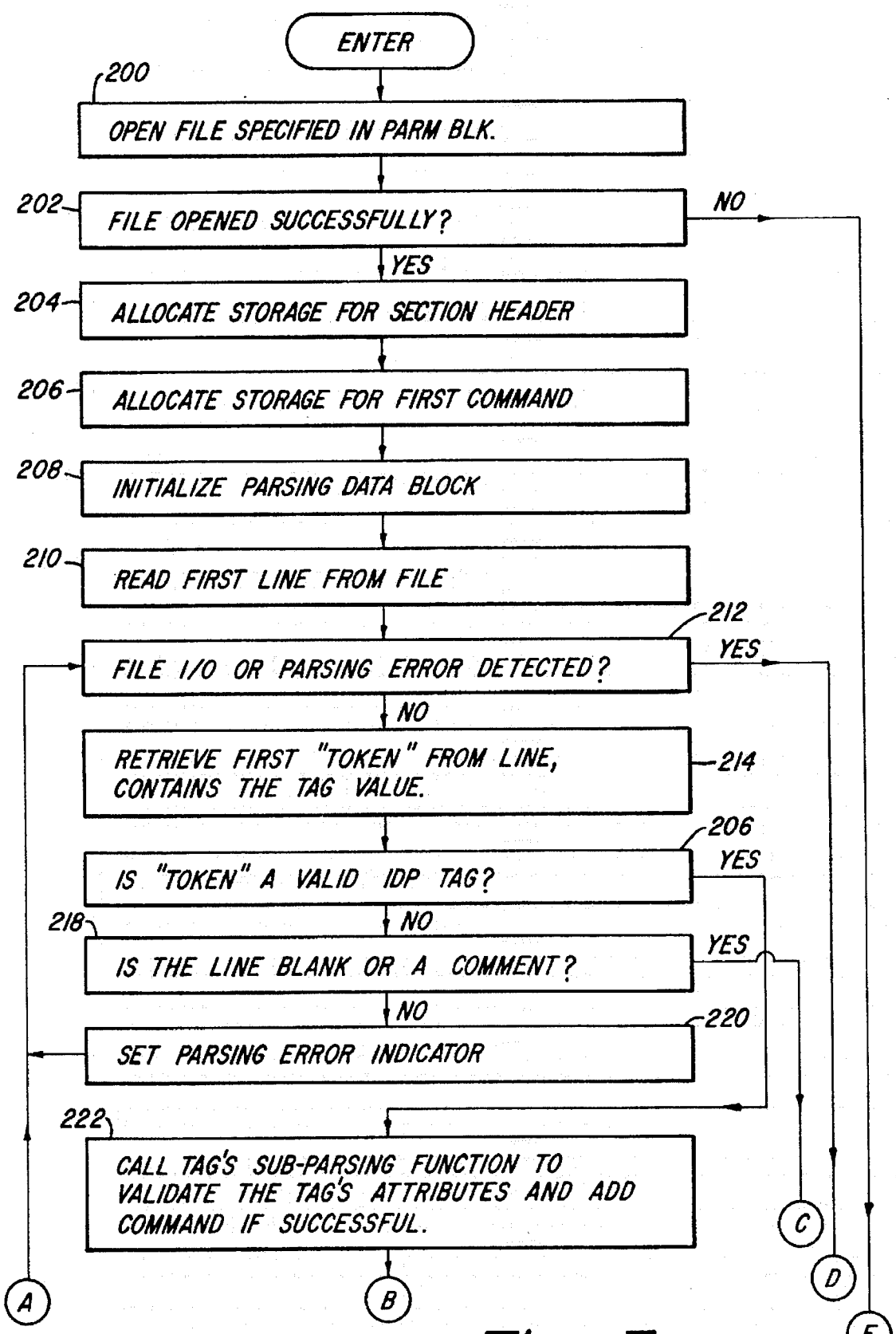
FIGS. 3a–3b represent a high level logical flow chart illustrating parsing of individual installation data profiles in accordance with the method and system of the invention.
Figure 3B:
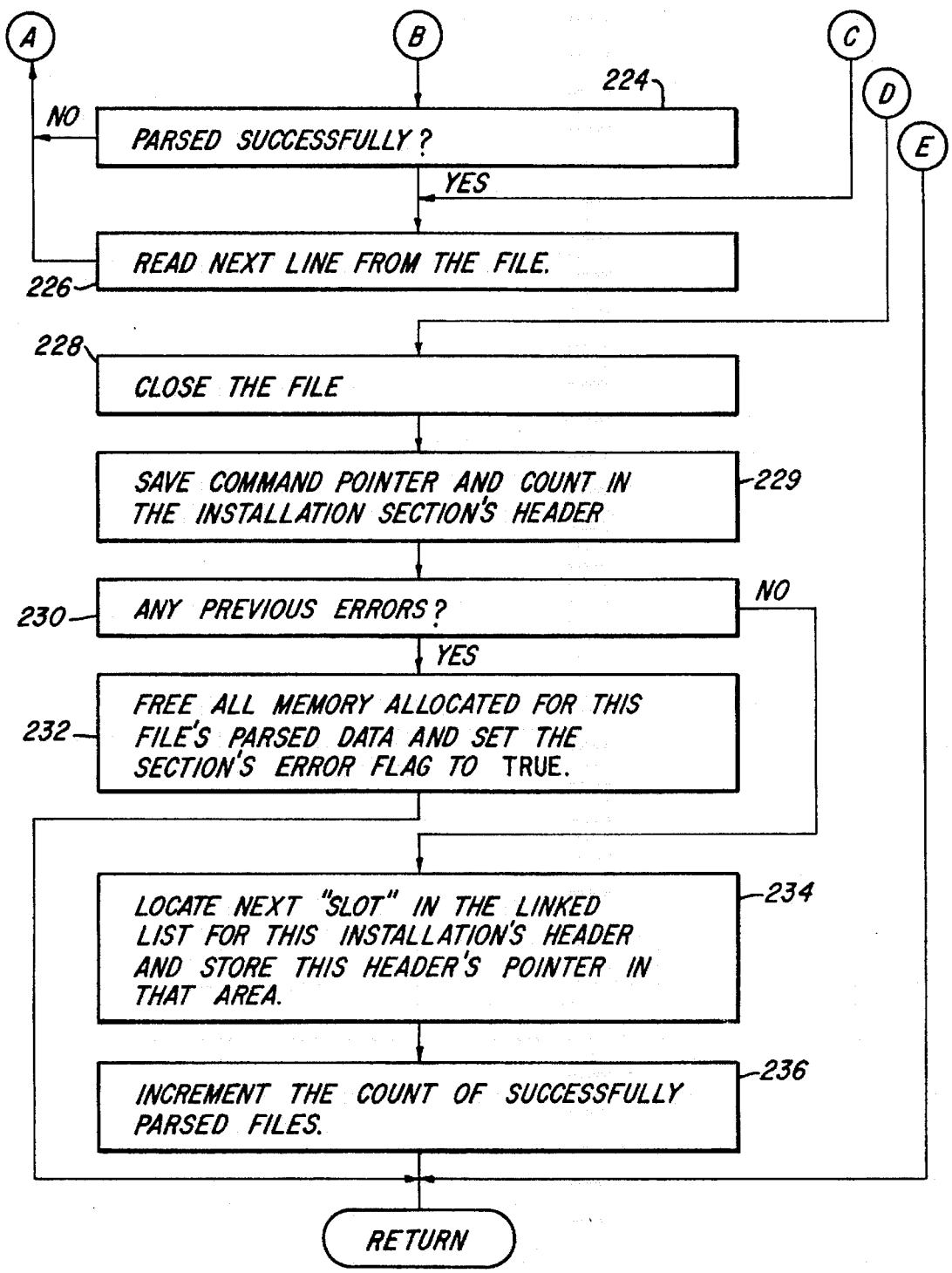

FIG. 3 illustrates execution of a parse function to provide control and routing required to parse an individual installation data profile file. FIG. 3 corresponds to a more detailed description of the step represented by block 84 in FIG. 2. Parsing is entered at step 200 where the file designated by a pointer in a parameter block is opened. Next, at step 202, it is determined if the attempt to open the file was successful. If the file was not opened successfully, the process is aborted and returned to the calling routine. If the file is successfully opened, steps 204, 206 and 208 are executed relating to initialization of appropriate data structures to handle the parse operation. Next, at step 210, the first line from the file is read. At step 212, it is determined if the last operation resulted in an input/output or parsing error. If error is detected, operation is advanced to step 228. If no error is detected, step 214 is executed to retrieve a first token from the last recovered line. The first token in the line should be one of the fifteen tags listed in Table 1. At step 216, it is determined if the recovered token appears on the list of Table 1. If the token is not a valid installation data profile tag, it is next determined if the line is blank or a comment. If the line is neither blank nor a comment, a parsing error indicator is set and the process is returned to step 212 where the error indication will force taking the YES branch from step 212 down to step 228. The YES branch from step 218, corresponding to determination that the line was blank or a comment result in execution of step 226 which is recovery of the next line. The process returns to step 212 for analysis of the new line.

If the token recovered at step 214 was determined to be a valid installation data profile tag at step 216, step 222 is executed which results in a call to the command function identified by the tag in Table 1. The command or "subparsing functions" are set out in detail in FIGS. 4–18. Success in execution of the call is detected at step 224 with a result that the next line from the file is read. If the call was unsuccessful, the process is returned directly from step 224 to step 212 with a parsing error indication.

Upon parsing of a complete file, a file input/output error will be detected and execution will advance from step 212 to step 228. At step 228, the file is closed. At step 229, the command pointer and the count in the installation sections' header are saved. Next, at step 230, it is determined if any parsing errors occurred during the parse operation. If such errors did occur, step 232 is executed resulting in release of all memory allocated for the parse data from the file and the setting of the sections' error flag to TRUE. The process is then returned to the calling process of FIG. 2. If no errors relating to parsing were detected, steps 234 and 236 are executed which relate to setting of pointers appropriate for continued parsing of the link list and incrementation of the count of successfully parsed files. Operation is then returned to the calling program.

Figure 4A:
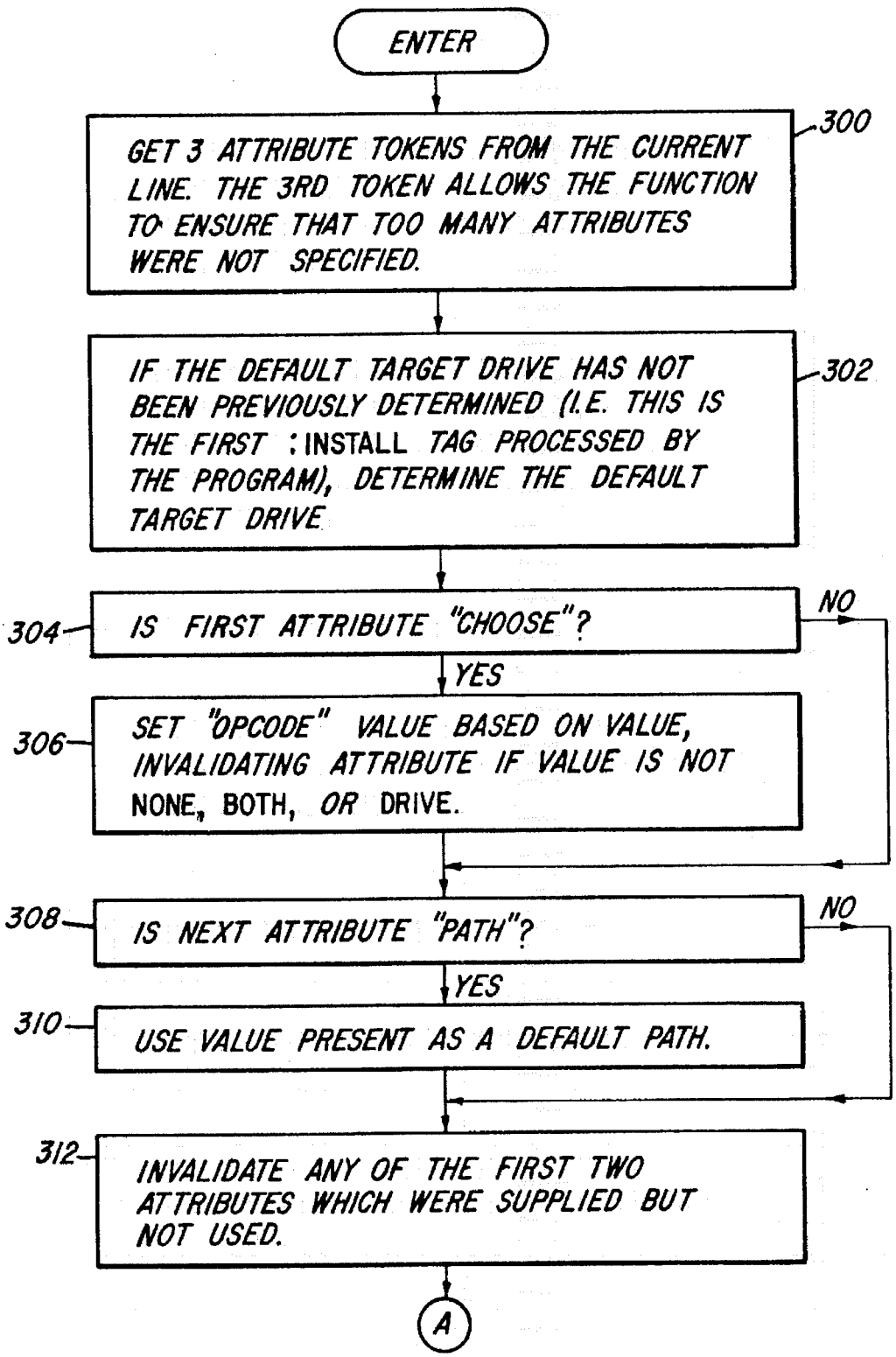
FIGS. 4a–4b represent a logical flow chart illustrating a command specification for a functional tag utilized to implement the method and system of the present invention.
Figure 4B:
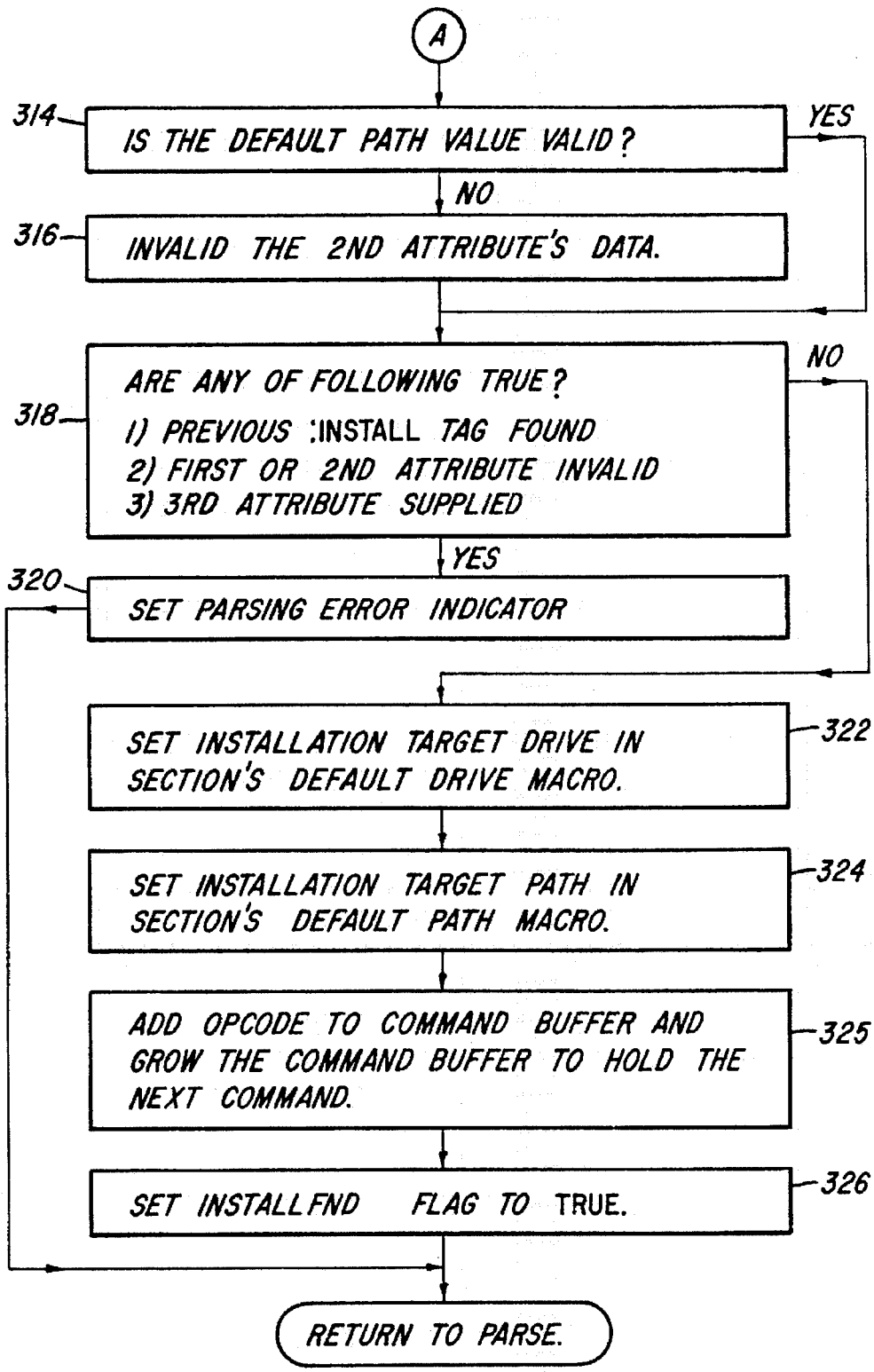

Fifteen separate functions may be specified through use of the tags of Table 1. FIG. 4 illustrates the command function relating to the tag :INSTALL. The :INSTALL tag relates to starting an installation section and specifies whether the user is to be allowed to choose the target drive and if so whether only the drive or the drive and subdirectory are to be gathered from the user and the default target subdirectory for installation. The function is also responsible for determining the default installation target drive. The default target drive will be either the current computers' first hard drive, first removable media drive if there is no hard drive, or a first network drive if the computer has no local drives. The :INSTALL tag must appear in installation data profile, and all remaining tags within the file must come after the :INSTALL tag. The function has two attributes a "choose=" attribute and a "path=" attribute.

The subroutine is entered at step 300 with recovery of three attribute tokens from the current line. One more token than allowed is recovered to detect incorrect use of the tag. At step 302, the default target drive is determined, if required. At step 304, it is determined if the first attribute is CHOOSE. The attribute is invalidated if the value set is not none, both or drive. At step 308, it is then determined if the second attribute is PATH. If it is, the value presented is used as the default path (step 310). Next, step 312 is executed which invalidates either attribute if they were supplied without selection of a value. Next, at step 314, it is determined if the default path value is valid. If not, step 316 is executed to invalidate the second attribute. Next, step 318 is executed which tests whether a previous :INSTALL tag has been found, if either the first or second attribute is invalid, or whether a third attribute token was supplied. Occurrence of any of these conditions is an error in syntax or semantics and results in execution of step 320 where the parsing error indicator is set. The process is then returned to the parse routine described in FIG. 3. If no error was located, steps 322, 324, 325 and 326 are executed to modify the command buffer for future interpretation and to add space to the buffer to hold the next command found. The InstallFnd flag is set true for use by later command functions in syntactic analysis. Operation is then returned to the parse routine.

Figure 5:
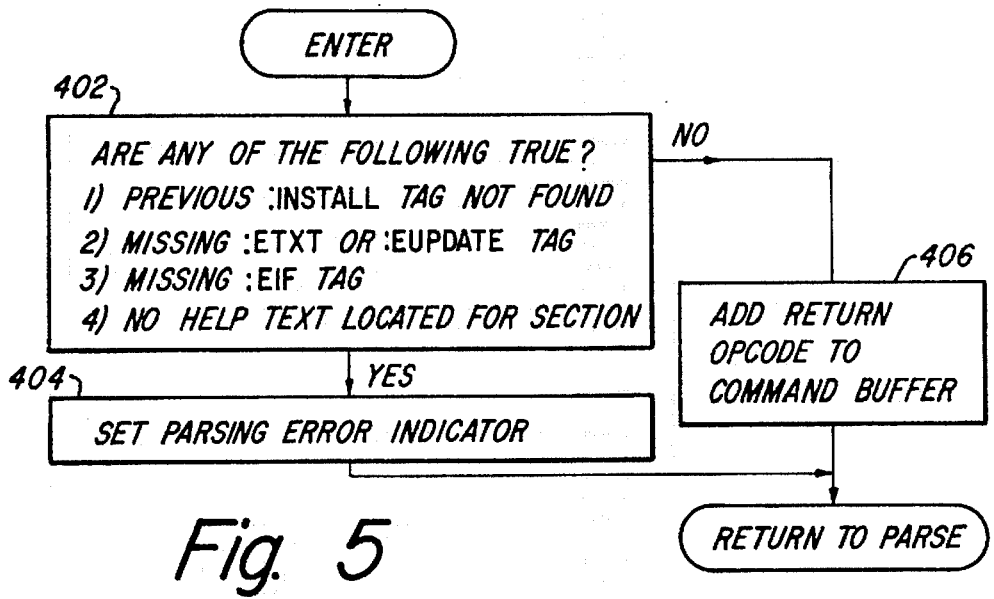
FIG. 5 is a logical flow chart illustrating a command specification for a functional tag utilized to implement the method and system of the present invention.

FIG. 5 depicts a flowchart specifying the command function relating to the tag :EINSTALL. The function is called by parse when the tag present in the current line is that responsible for validating that all ending conditions have been specified in the file and that a valid :HELP tag has been processed. Essentially the tag is utilized to conclude an installation data file and if successfully parsed, results in addition of a command to the command buffer that will result in the interpreter returning to the main menu. The command takes no direct inputs. The process is entered at step 402 where the following four conditions are tested: absence of a prior :INSTALL tag, absence of a :ETXT or :EUPDATE tag, absence a :EIF tag or absence of a help text for the section. Occurrence of any of these conditions results in step 404 being executed which is a return of a set parsing error indicator. If none of the conditions are met, step 406 is executed resulting in return of an appropriate operational code to the command buffer and a return of operation to the parse routine.

Figure 6A:
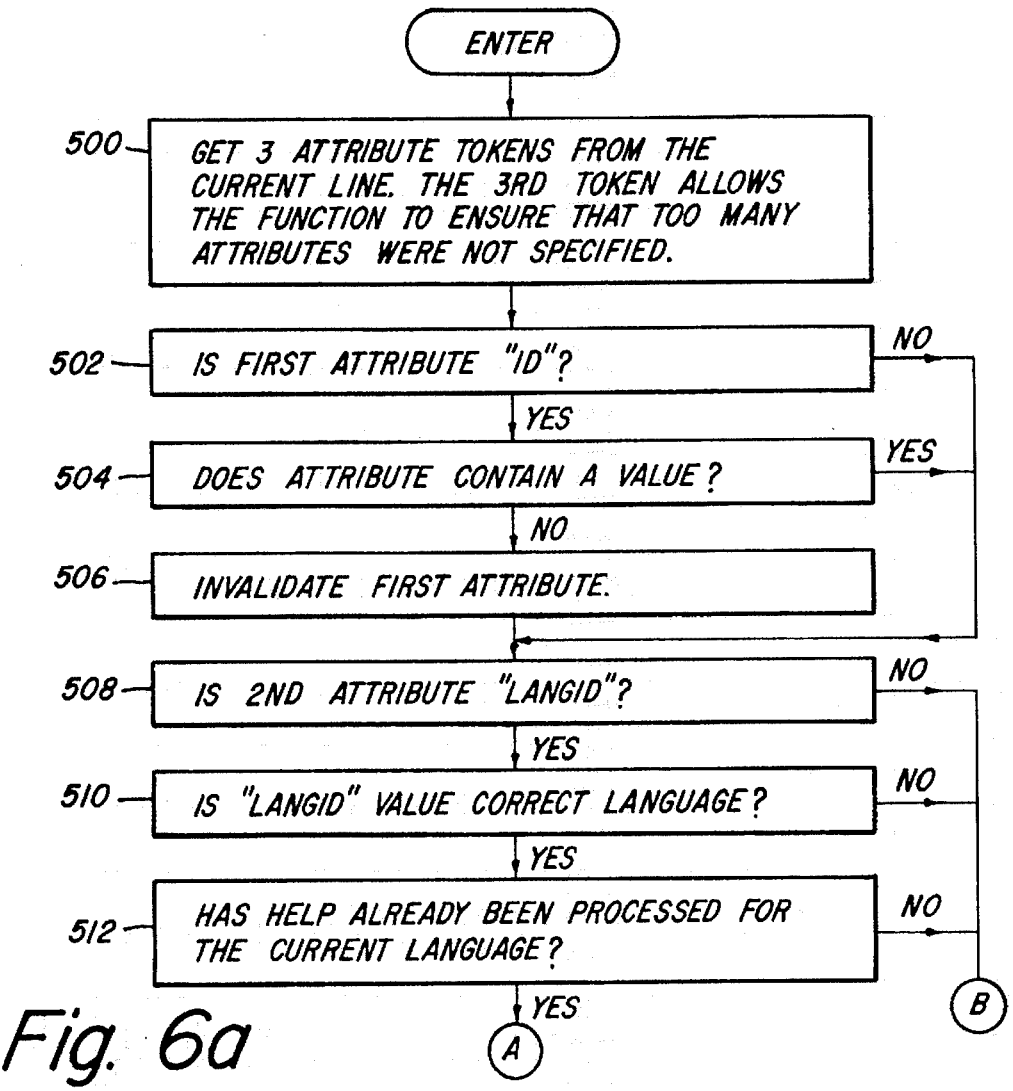
FIGS. 6a–6b represent a logical flow chart illustrating a command specification for a functional tag utilized to implement the method and system of the present invention.
Figure 6B:
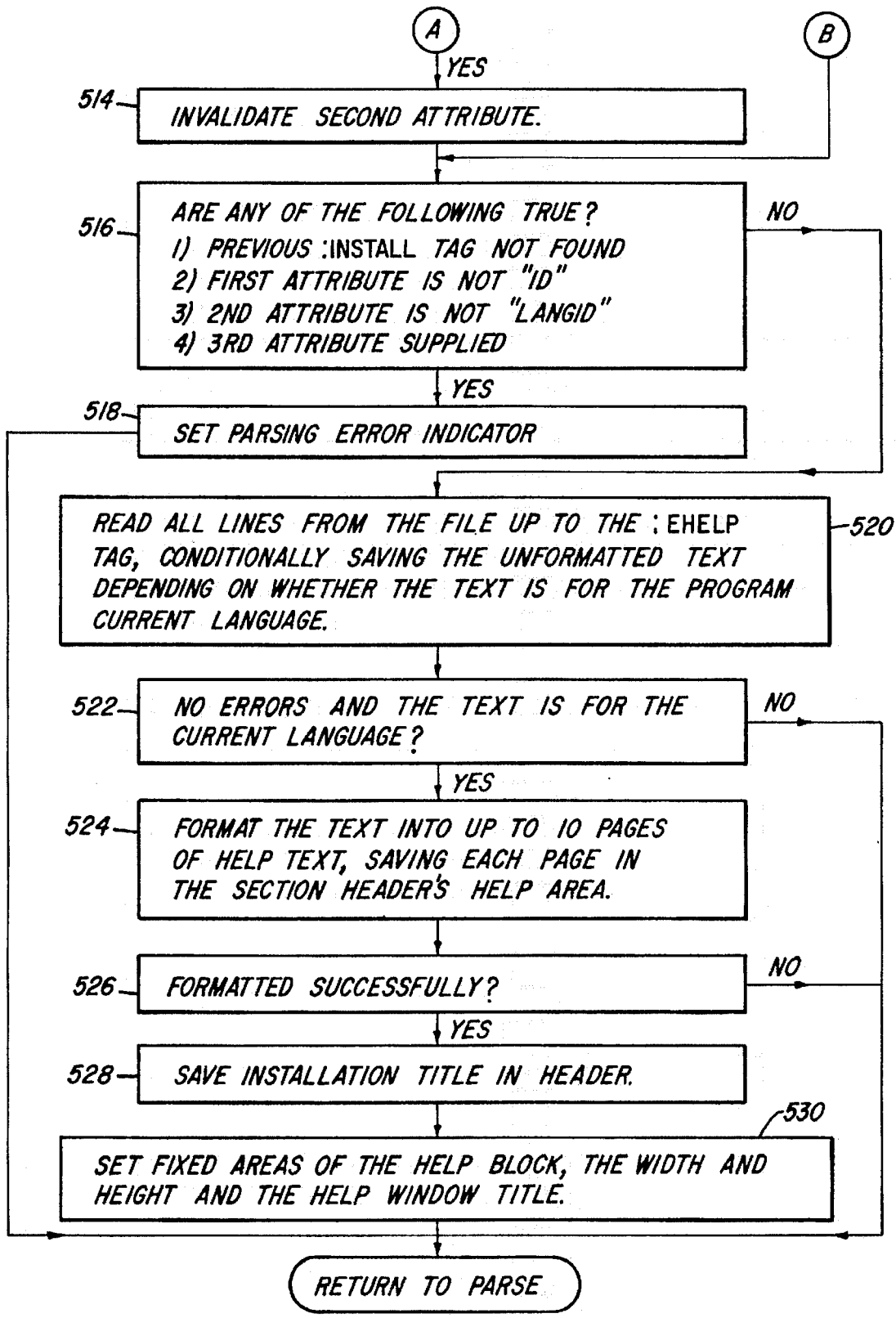

FIG. 6 illustrates a flowchart for a command function named ParseHelp which is called by the parse routine when the tag :HELP is encountered. The :HELP tag specifies the text the program uses on its main menu for the installation, the text the program uses in the help windows, and the language identifier associated with the text. The function processes all lines following the line up to and including an :EHELP tag. If the tag is successfully parsed and the text for the tag is associated with the program's customized language, the function sets the section's title string and help text pointers within the section header. The function validates that the attributes "ID" and "LANGID" are specified. The help text lines are either read into an unformatted buffer, and if in the program's current language, the unformatted buffer is then formatted into up to ten pages of help text. The process is entered at step 500 with recovery of the three attribute tokens from the :EHELP tag line. Next, at step 502 it is determined if the first attribute is "ID". If it is, step 504 is executed to determine if the attribute contains a value. If no value is specified, step 506 is executed to invalidate the first attribute.

Next, step 508 is executed to determine if the second attribute is "LANGID". If true, step 510 is executed to determine if the value for LANGID is a currently supported national language. If the value is a currently supported national language, step 510 is executed to determine if help text has already been processed for the current language. If help text has already been processed, step 514 is executed to invalidate the second attribute.

Next, step 516 is executed to determine if a previous :INSTALL tag has not been found, if the first attribute is not ID, if the second attribute is not LANGID, or if a third attribute has been supplied. Occurrence of any of these events indicates error. Step 518 is executed to set the parsing error indicator and force immediate return to the parse routine.

If no error was located, step 520 is executed with the result that all lines of the file up to a :EHELP tag are read and saved to an unformatted buffer. Next, at step 522, it is determined if the text read is for the current language. If the text is a current nationally supported language, the text is formatted and at step 526 it is determined if the format was successful. If the format attempt is successful, steps 528 and 530 are executed to save the installation title in a header and to set fixed areas for a help block including width and height of its window for display. The process is then returned to the parse control routine.

Figure 7A:
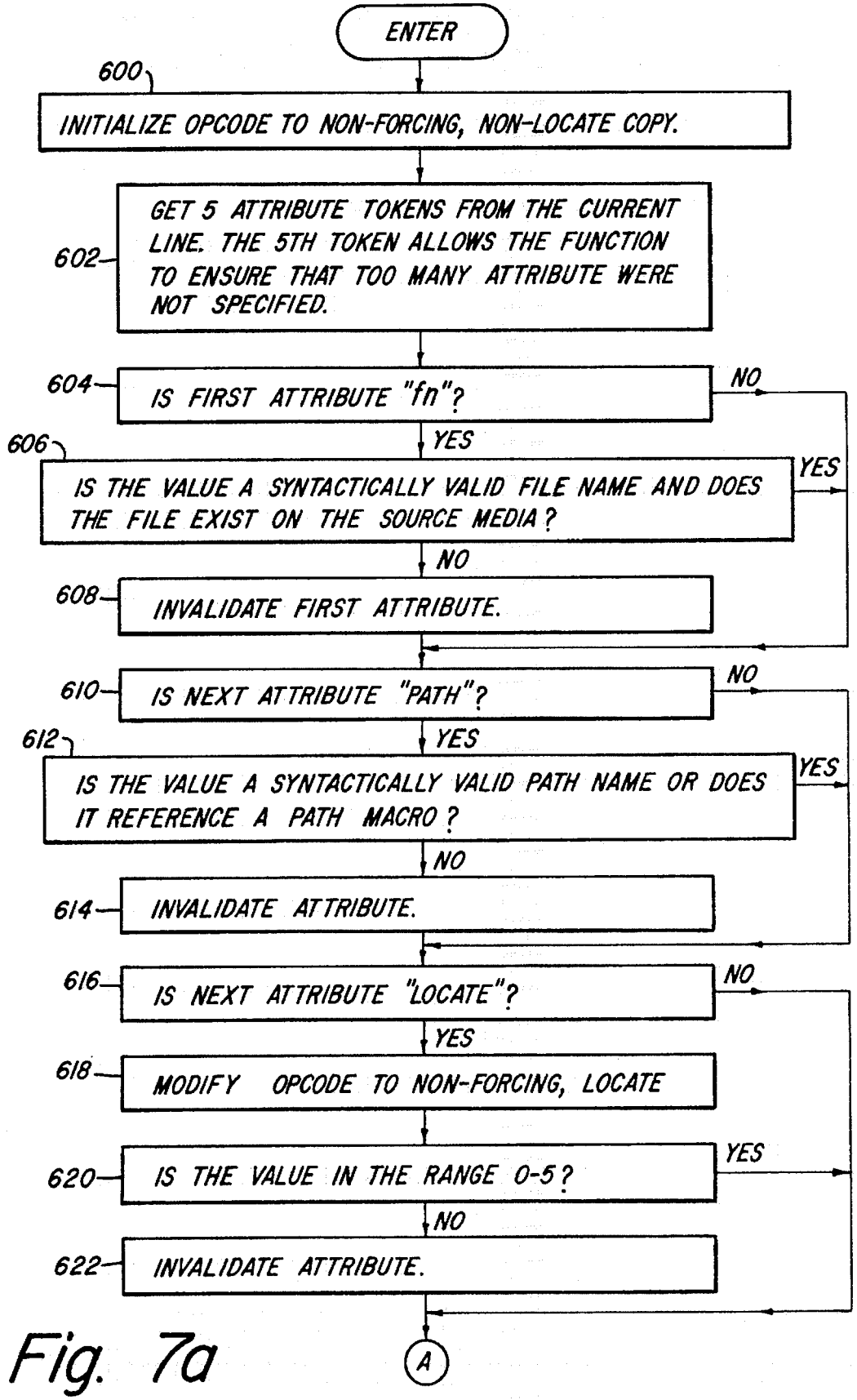
FIGS. 7a–7b represent a logical flow chart illustrating a command specification for a functional tag utilized to implement the method and system of the present invention.
Figure 7B:
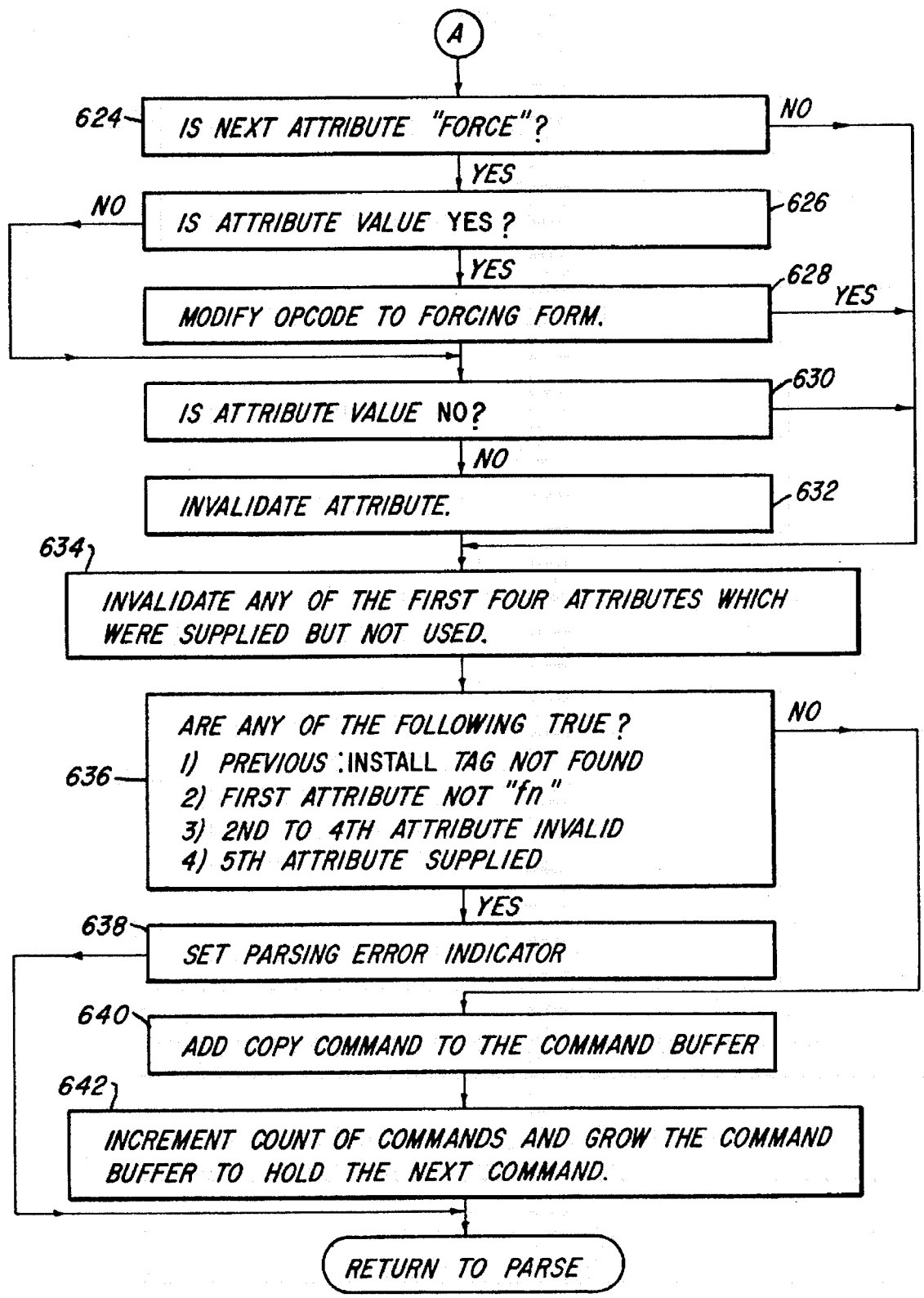

FIG. 7 illustrates a ParseCopy command function called by parse when the tag present in the current line of installation data profile is ":COPY". The COPY tag causes the program to copy a file from the source drive onto the target drive. Information supplied with the tag controls how the program performs the operation. The command function is entered at step 600 with initialization of an operation code to nonforcing and nonlocate. The tag takes up to four attributes. At step 602, five attribute tokens are recovered from the current line. Steps 604, 606 and 608 relate to determination of the first attribute as a syntactically valid file name and whether the file exists on the source medium. Next, steps 610, 612 and 614 relate to the second attribute which should be PATH. It is determined if the path name is syntactically valid or whether it is a successful reference to a path macro. Next, at steps 616, 618, 620 and 622 it is determined if the next attribute is LOCATE. If "LOCATE" is found, the operational code set is step 600 is modified and the value is tested against a valid range.

Next, at steps 624, 626, 628, 630 and 632 it is determined if the next attribute is equal to force and if a value supplied is YES, which modifies operational code forcing form. At step 634, any of the first four attributes which were supplied but not given a specified value are invalidated. Step 636 provides error detection functions which occur if no prior INSTALL tag has been used, if the first attribute is not for a file name, if and of the second through the fourth attributes are all invalid or if a fifth attribute is supplied. Again, occurrence of any error results in the setting of a parsing error indicator at step 638. Absence of error results in execution of steps 640 and 642, which provide addition of a command to the command buffer and incrementation of the size of the command buffer to hold the next command.

Figure 8A:
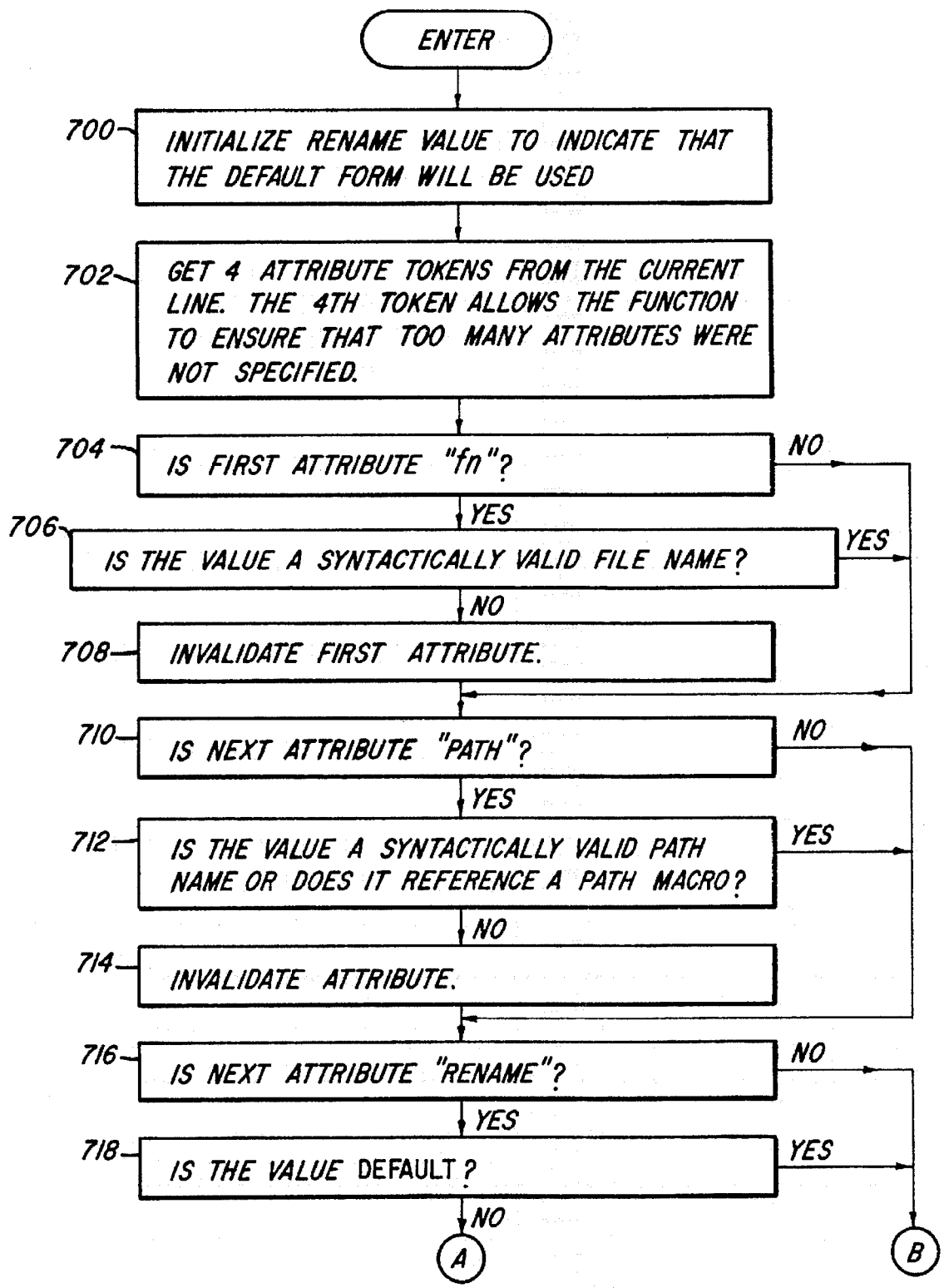
FIGS. 8a–8b represent a logical flow chart illustrating a command specification for a functional tag utilized to implement the method and system of the present invention.
Figure 8B:
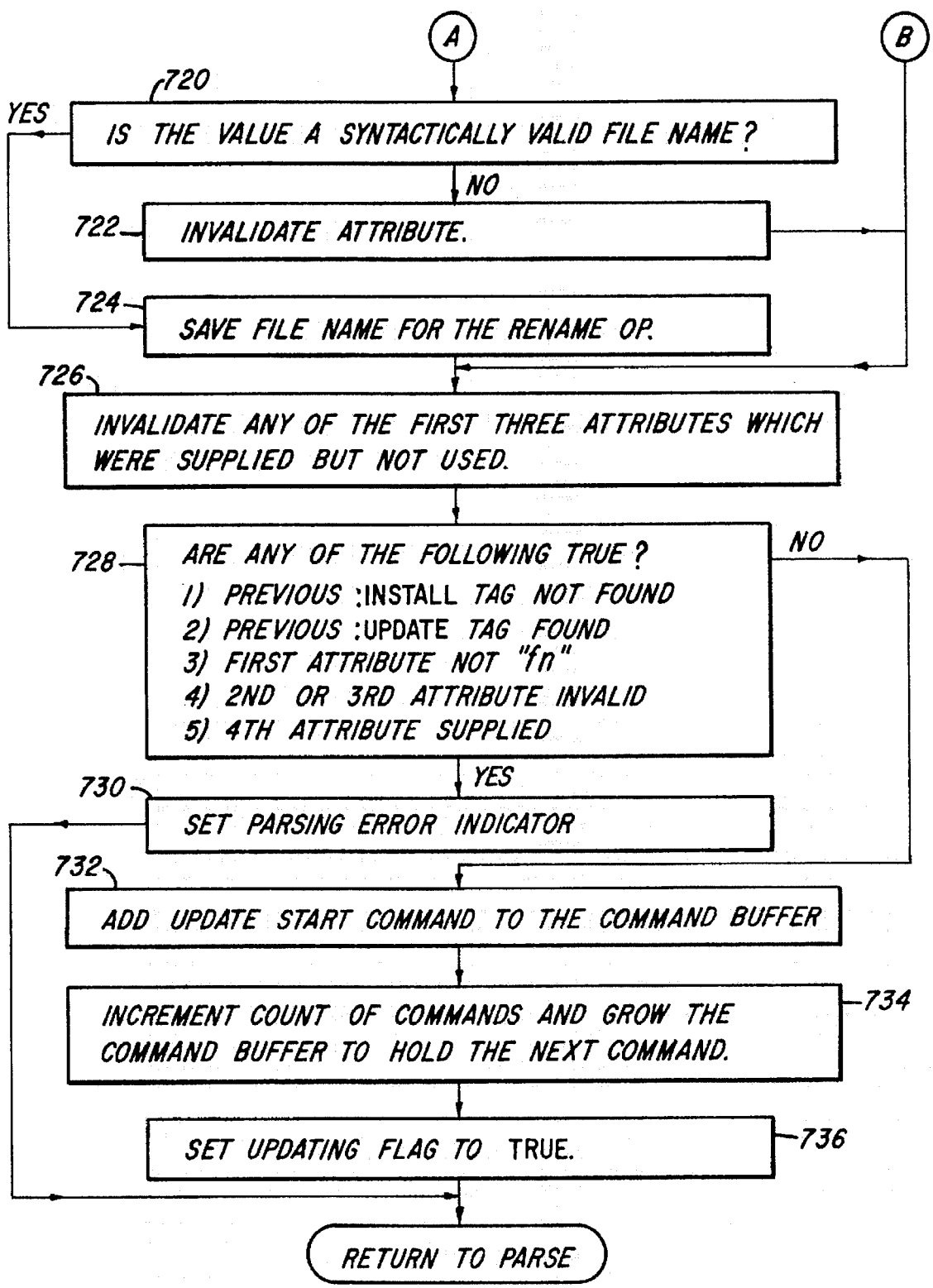

FIG. 8 depicts a flowchart for command function invoked by the tag :UPDATE. The :UPDATE tag specifies the name of the file to be updated, a subdirectory for the file and a file name to which any existing file is to be renamed prior to making the update. The function sets a parsing data flag called "updating" to true to indicate occurrence of an :UPDATE tag in the current installation data profile. This flag is used by the subparsers of the functions for the ":TXT" and ":LI" tags, since those tags are valid only within the boundaries of a :UPDATE and a :EUPDATE tags.

The process is entered at step 700 for initialization and at step 702 four attribute tokens from the current line are recovered. Steps 704, 706 and 708 are executed to determine if the first attribute is an "FN" attribute with a value conforming to a syntactically valid filename. Next, steps 710, 712 and 714 are executed to determine if the next attribute is the "path" attribute and if the value specified therefor is a syntactically valid path name or an appropriate reference to a path macro.

Next, steps 716, 718, 720, 722 and 724 are executed to determine if the next attribute is the "Rename" attribute. A filename is saved from a rename operation if the value is syntactically valid. Next, step 726 is executed to invalidate any of the first three attributes which were supplied but for which no value was specified.

Next, step 728 is executed to determine if appropriate conditions for use of the :UPDATE tag have been satisfied (items 1 and 2 relating to location of an :INSTALL and :UPDATE tags) and if appropriate attributes have been specified. Occurrence of any error results in the parsing error indicator being set and a return to parse (step 730). Absence of any error conditions results in execution of steps 732, 734 and 736 which relate to addition of a command to the command buffer and augmentation of the command buffer to hold the next command. The updating flag is set to true (step 730).

Figure 9:
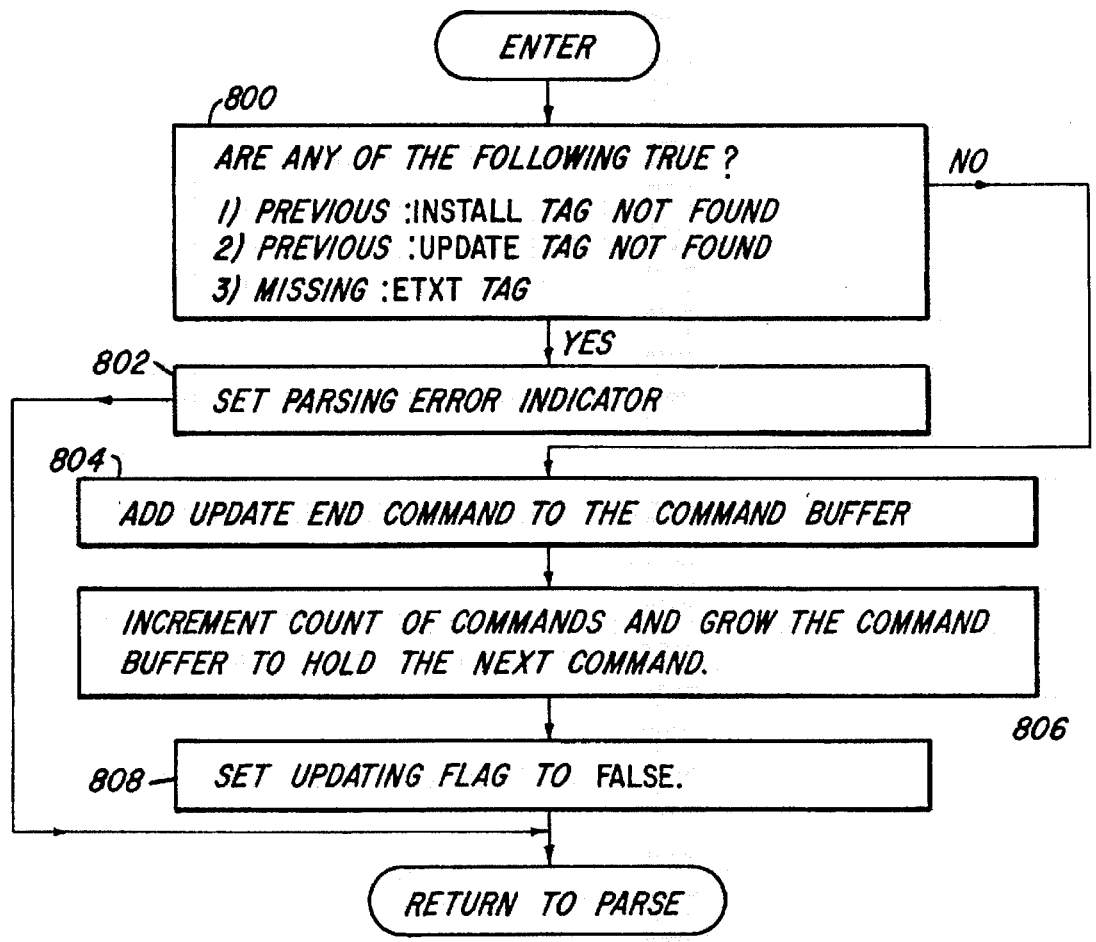
FIG. 9 is a logical flow chart illustrating a command specification for a functional tag utilized to implement the method and system of the present invention.

Associated with each :Update tag is an :EUpdate tag. This command function ParseUpdateEnd is illustrated in FIG. 9 which is entered at step 800. An :EUpdate tag must follow occurrence of an :INSTALL tag, occurrence of an :UPDATE tag, and occurrence of an :ETXT tag. These conditions are determined at step 800 and should any fail, a parsing error indicator is set by execution of step 802. If none of the conditions fail, steps 804, 806 and 808 are executed to an appropriate command to the command buffer, to increment the size of the command buffer, and to reset the updating flag to false.

The :TXT tag invokes the command function ParseTxt. The :TXT tag is used to find any existing line within the file to be updated and, optionally, to remove that line. The tag also specifies the location (top, bottom, before a file and line, or after a file and line) at which the text lines are to be added to the updated file. If the tag is successfully parsed, the command function adds a command to the command buffer only if that tag contain the check attribute. The function also sets the parsing data flag :TXTFND to true to indicate that text addition is allowed. The :TXT tag is allowed to occur only within lines delimited by the :UPDATE and :EUPDATE tags, i.e. while the parsing data flag updating has the value TRUE.

The process is entered at step 900 with appropriate initializations. Next, at step 902, three attribute tokens are recovered from the current line. Steps 904–908 relate to validation of the first attribute including the appropriate identity and inclusion of an appropriate check value. Next, steps 910, 912, 914, 916, 918, 920 and 922 are executed relating to validation of the second attribute "place" and determination of the value specified for the attribute. Next, step 924 results in invalidation of any attribute which was supplied but for which no value was assigned.

At step 926, it is determined if the position of the :TXT tag is correct and whether appropriate attributes were supplied and value specified therefore. Essentially, use of the :TXT tag is inappropriate if no prior :INSTALL or :UPDATE tag has been used. Use of the :TXT tag is inappropriate if parsing data flag "updating" is true. Invalidated attributes or inclusion of too many attributes (here three) are also considered error. Occurrence of any error condition results in step 928 being executed. If no error is generated by step 926, step 930 is executed to determine if a check attribute was specified. If one was, a check command is added to the command buffer and the count of commands and size of the command buffer are incremented. Next, at step 936 the text found flag, TXTFND, is set to true and an operational code value is added to be used by any :LI tags up to the next :ETXT tag.

Figure 11:
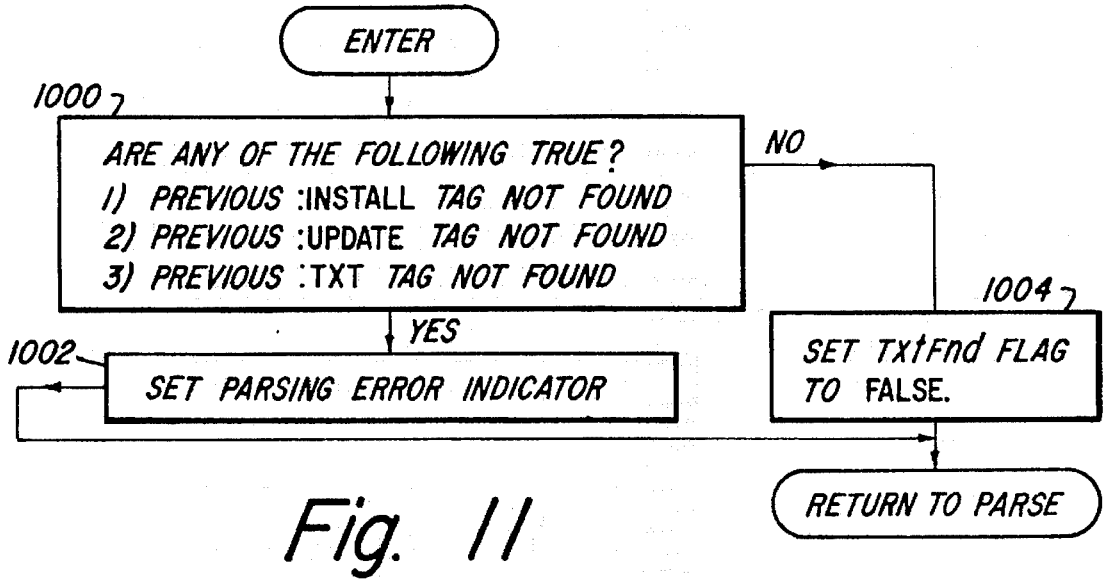
FIG. 11 is a logical flow chart illustrating a command specification for a functional tag utilized to implement the method and system of the present invention.
Figure 10A:
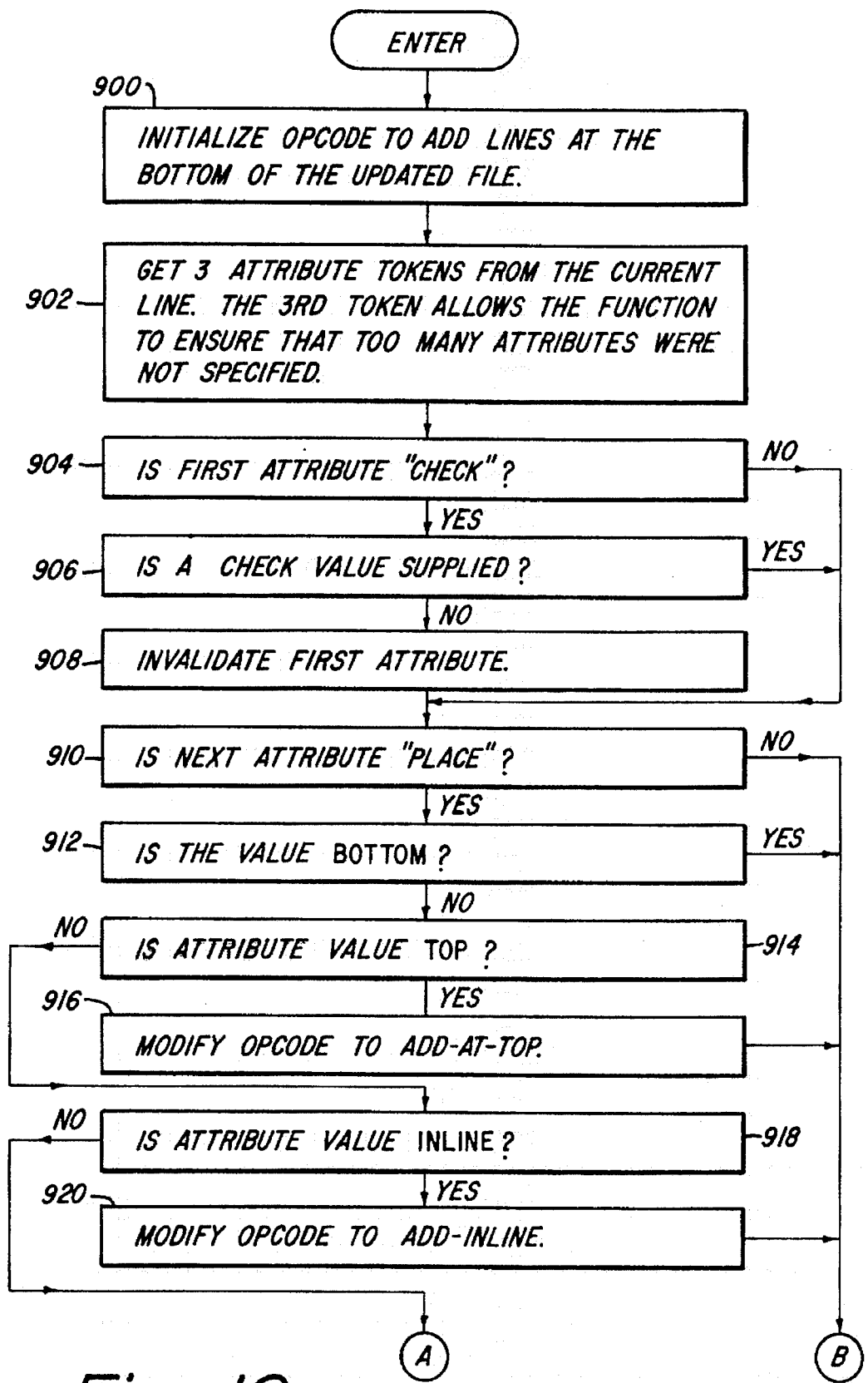
FIGS. 10a–10b represent a logical flow chart illustrating a command specification for a functional tag utilized to implement the method and system of the present invention.
Figure 10B:
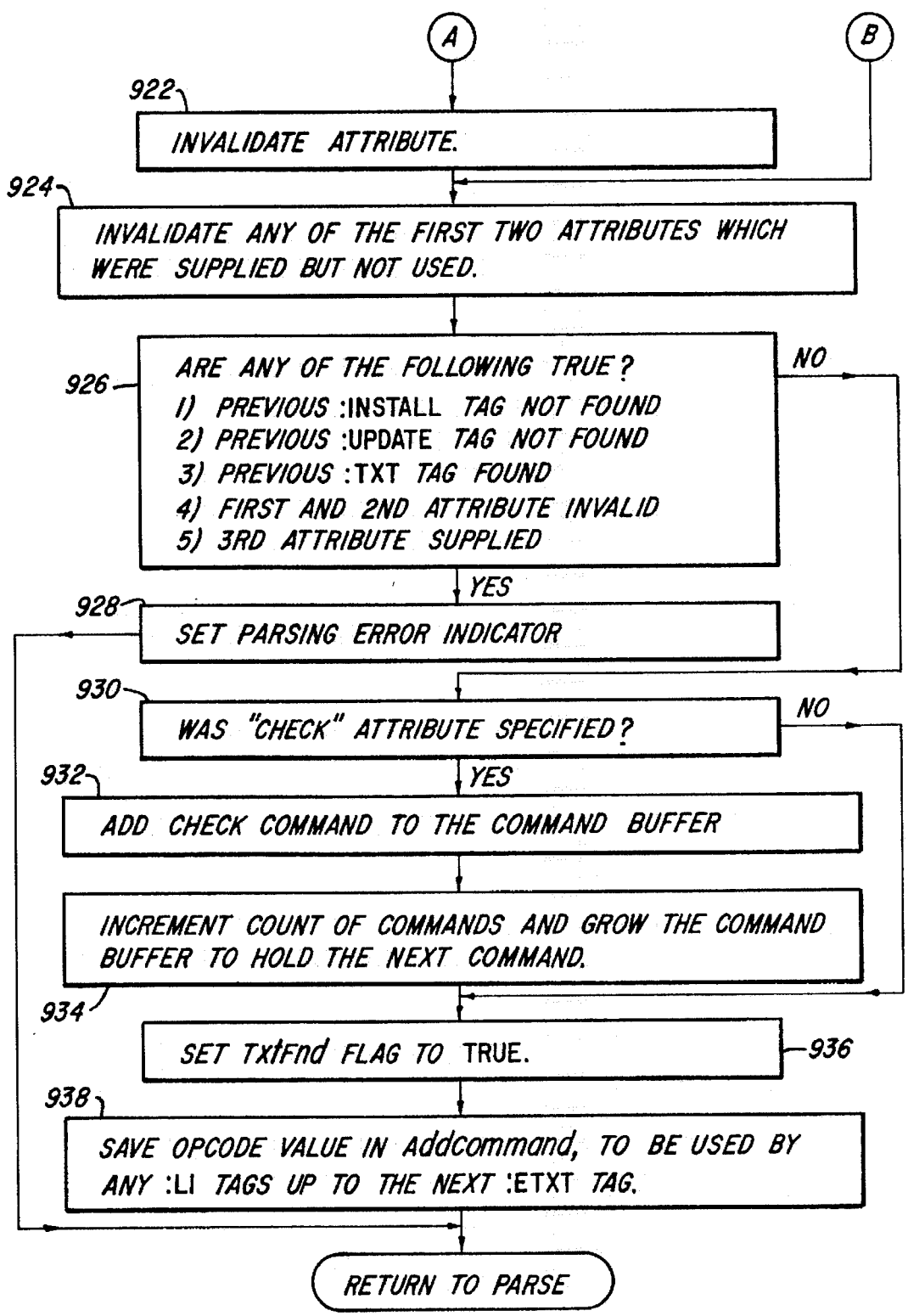
Figure 12:
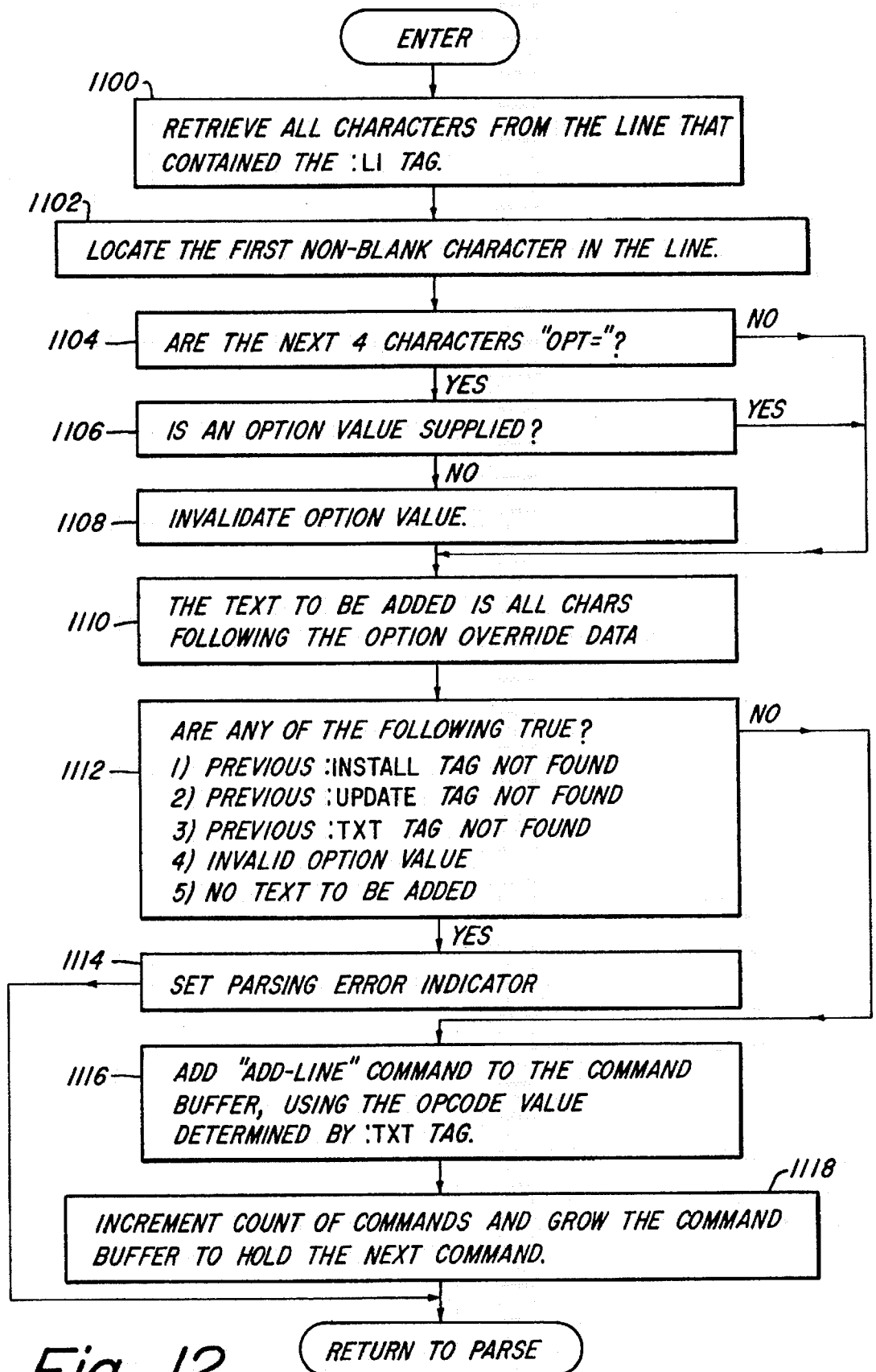
FIG. 12 is a logical flow chart illustrating a command specification for a functional tag utilized to implement the method and system of the present invention.
Figure 13A:
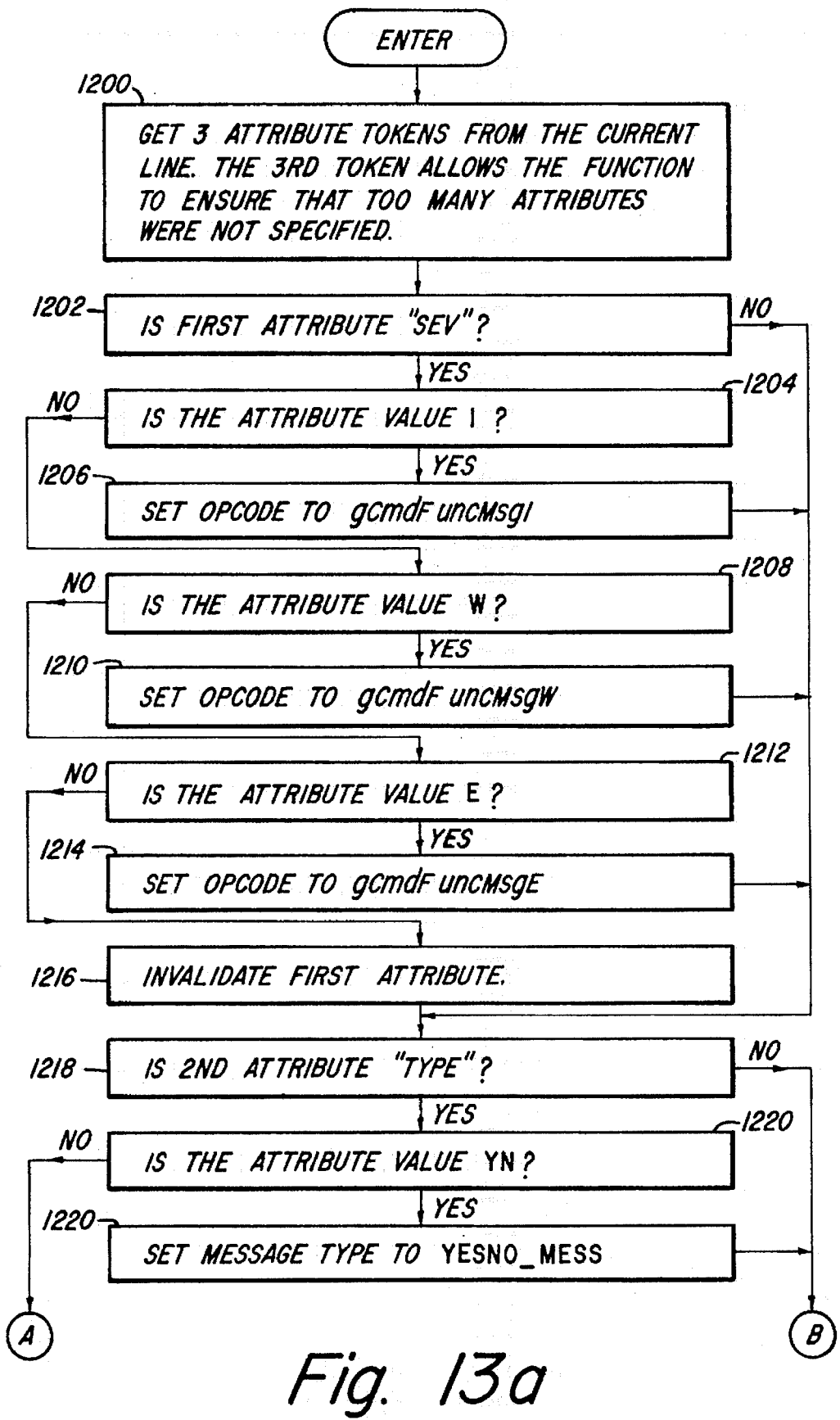
FIGS. 13a–13d represent a logical flow chart illustrating a command specification for a functional tag utilized to implement the method and system of the present invention.
Figure 13B:
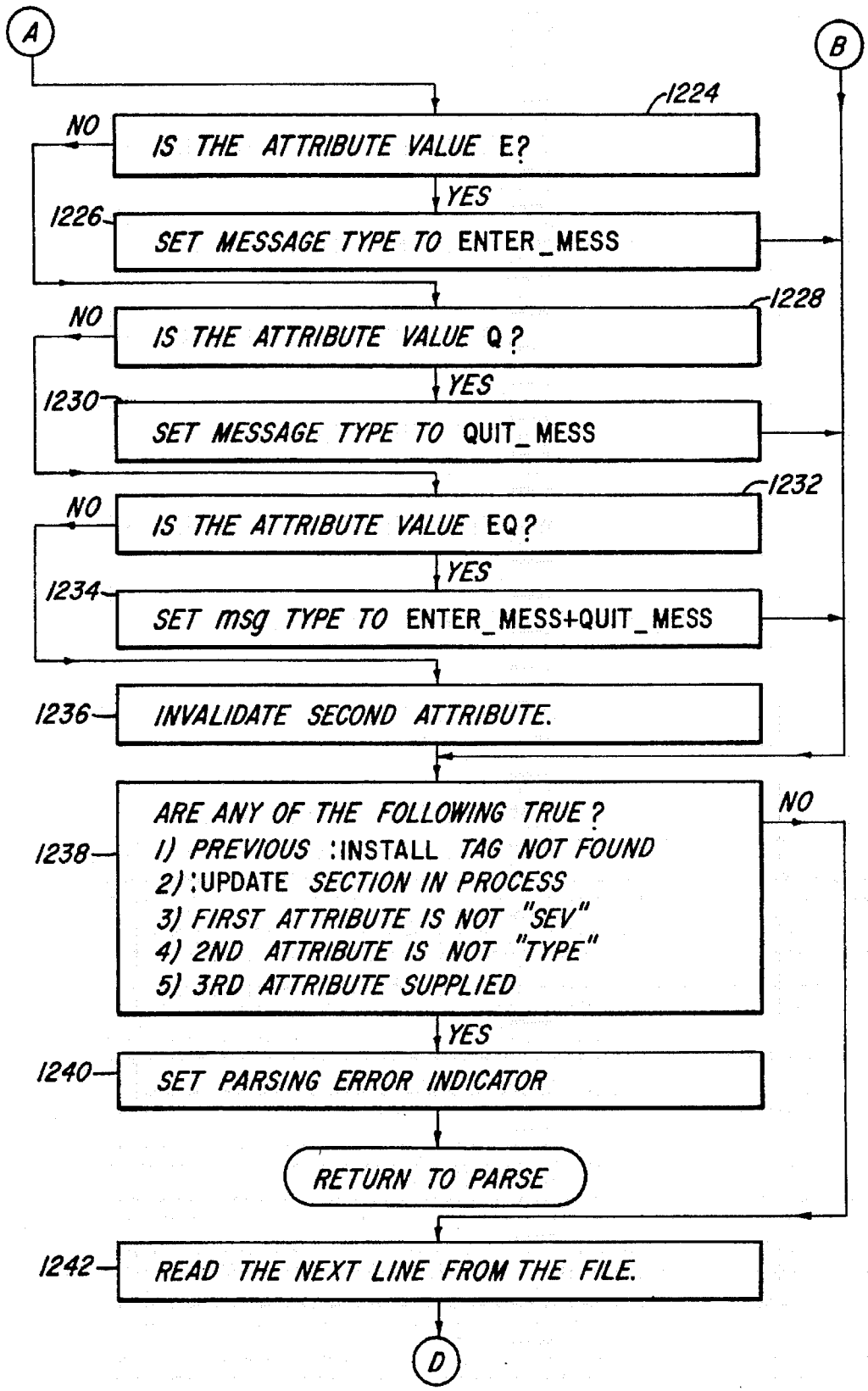
Figure 13C:
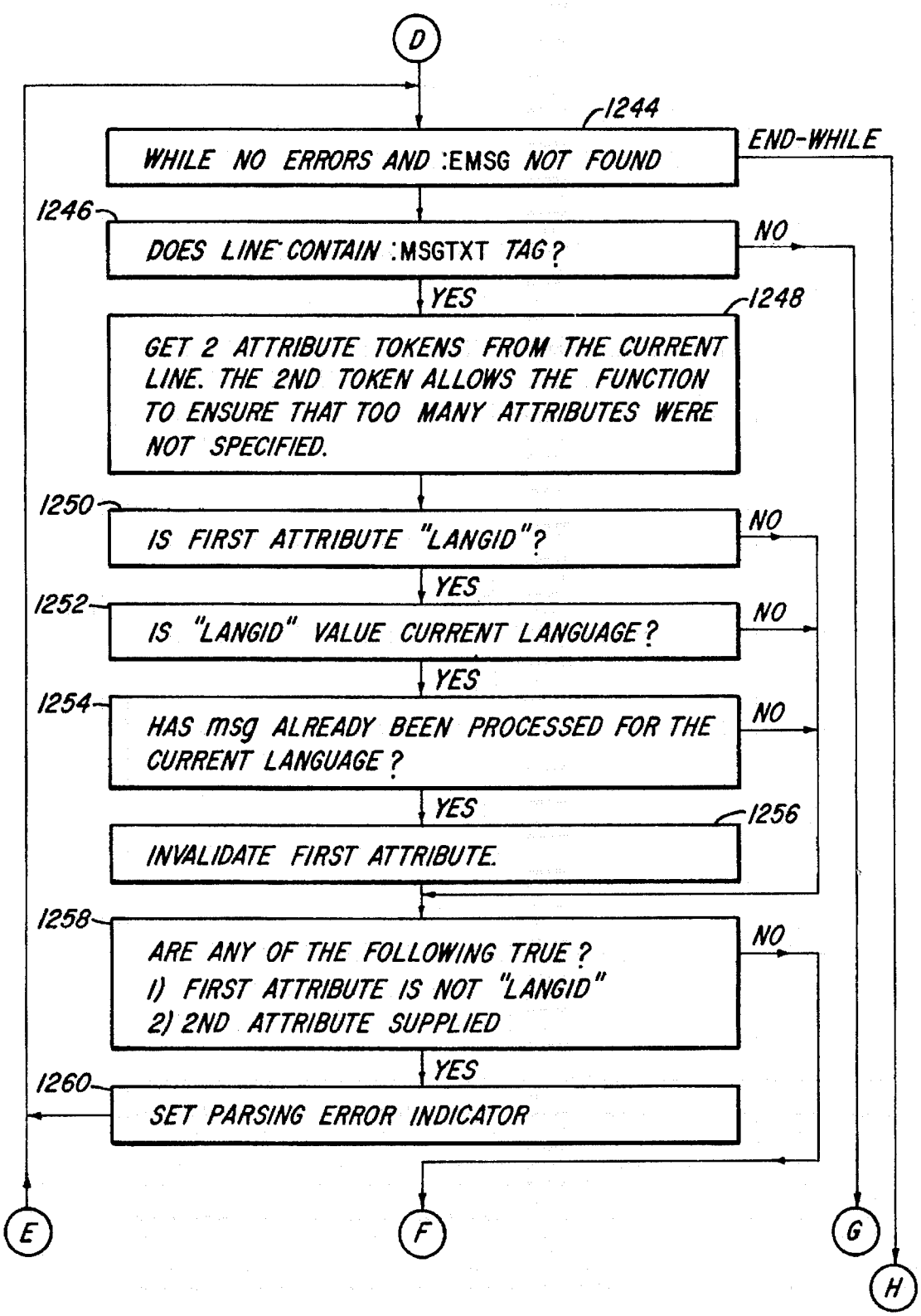
Figure 13D:
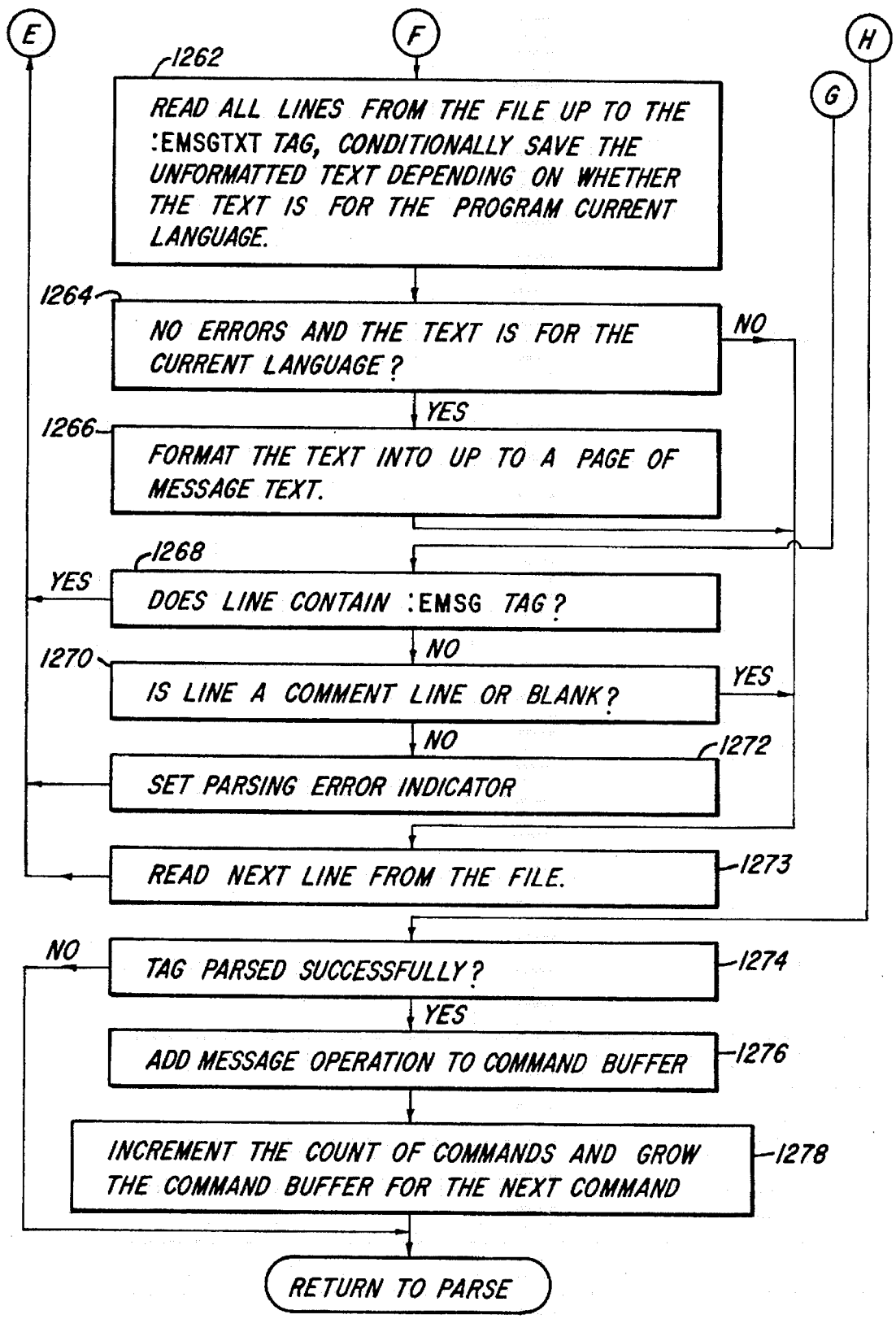

The :TXT tag invokes the command function ParseTxtEnd. The function is executed to reset the parsing data flag :TXTFND to false. Essentially the function is appropriately executable, and the occurrence of the tag syntactically correct, if a prior :INSTALL tag and :UPDATE tag and :TXT tag are present in the installation data profile. The process is illustrated in FIG. 11. Syntax and semantics are analyzed at step 1000. At step 1002, a parsing error indicator is set if the conditions are not met. At step 1004 the set :TXTFND flag is set to false if the syntax was correct.

The command function named ParseLineIns is called by the parse when the tag present in the current line is :LI. The :LI tag adds lines to the file named by the previous :UPDATE tag at the location specified by the previous :TXT tag. The parsing of the :LI tag is handled differently from all other tags since the :LI tag contains both an optional attribute and textual information all on one line. The :LI tag is allowed only within lines delimited by the :TXT and :ETXT tags, i.e. while the parsing data flag "TXTFND" is true. The process is entered at step 1100 with retrieval of all characters from the line that contains the :LI tag. Next, at step 1102 the first nonblank character in the line is located. At step 1104, it is determined if the next four characters are :OPT=:, i.e. whether the option attribute is present. At step 1106, it is determined if an option value has been supplied. If the attribute token has been used but no value supplied, the option value is invalidated at step 1108. Next, at step 1110, all characters following the option override data are added as text. Next, step 1112 is executed to validate the syntactic location of the :LI tag or if an error in use of the option attribute token was made. Any error results in execution of step 1114 and results in a parsing error indicator being set. If the tag has been appropriately used, steps 1116 and 1118 are executed to modify the command buffer.

The :MSG tag invokes the function ParseMsg from the parse routine. The :MSG and :MSGTXT tags are used to cause the program or display a message to the end user. Messages are defined at specific warning severity levels, those being: informational; warning; or error and further specifies specific processing options to present to the use, consisting of "enter key active", "escape key active", "both enter and escape keys active", and "yes/no" keys active. Occurrence of the :MSG tag results in process by the command function of all lines up to the next :EMSG tag. Successful parsing of the tag adds a message command to the command buffer depending upon the attribute value of the "SEV" attribute for the tag. The command function further determines if the message text present in the file is in the current national language of the system. Text lines are read into an unformatted buffer pending determination of whether the language is current. Formatting occurs upon determination that the language of the message is current.

FIG. 13 illustrates the ParseMsg process which is entered at step 1200 with recovery of three attribute tokens from the current line. Steps 1202, 1204, 1206, 1208, 1210, 1212, 1214 and 1216 are all related to evaluation of the "SEV" or message severity attribute. The attribute can assume one of three attribute values which are specified using letter codes. The attribute value must be compared against each possibility before generation of the pseudo code command for inclusion in the command buffer. Specification of an incorrect value results in invalidation of the first attribute.

Steps 1218, 1220, 1222, 1224, 1226, 1228, 1230, 1232, 1234 and 1236 relate to evaluation of the second attribute. The second attribute relates to specification of active keys and can take one of four values, occurrence of each which must be checked for. Validation of the second attribute occurs if a correct value for the attribute is specified.

At step 1238, syntactic analysis is performed on the tag and its attributes. If error is detected a parsing error indicator is set at step 1240. If no error is found, the process continues to step 1242 which provides the next line from file be read. Step 1244 provides for looping control through steps 1246 through 1273. So long as no errors are found and no :EMSG tag is found in the intervening step, the process will continue to loop. At step 1246, it is determined if a line contains the :MSGTXT tag. Steps 1248, 1250, 1252, 1254 and 1256 relate to validation of the attributes for the :MSGTXT function. Next, at step 1258, analysis of a line including a :MSGTXT is performed and if error is found step 1260 is processed to set the parsing error indicator and to return the process to step 1244 to escape the loop. If the :MSGTXT tag passes analysis in step 1258, step 1262 is executed resulting in all lines of the file being read up to a :EMSGTXT tag. The material is conditionally saved in unformatted text and at step 1264 it is determined if error occurs in the text or if the end of the text is for the current language. If no errors are present and the text is in the current language, step 1266 is executed resulting in the text being formatted up to one page in length. If errors occurred or the text was not for the current language, step 1273 is executed to read the next line from the file.

The NO branch from step 1246, relating to a line containing :MSGTXT tag should be encountered only upon the conclusion of treatment of text lines following that tag. Accordingly, the NO branch from step 1246 leads to processing of step 1268 which determines if the line contains the :EMSG tag. If it does, processing is returned to step 1244 to exit the loop. If the line does not contain the :EMSG tag, it is determined at step 1270 if the line is a comment line or a blank. If the line is a comment line or a blank, step 1273 is executed to recover the next line from the file. If the line is not a comment or a blank, an error has occurred and the parsing error indicator is set and the processing returns to step 1244 to terminate the loop on the basis of location of error.

Upon exit from the loop, step 1274 determines if the tag was successfully parsed, i.e. no error was returned from exit of the loop at step 1244. Return of error results in immediate return to the parse routine. If the tag was successfully parsed, steps 1276 and 1278 are executed to modify the command buffer appropriately.

Figure 14:
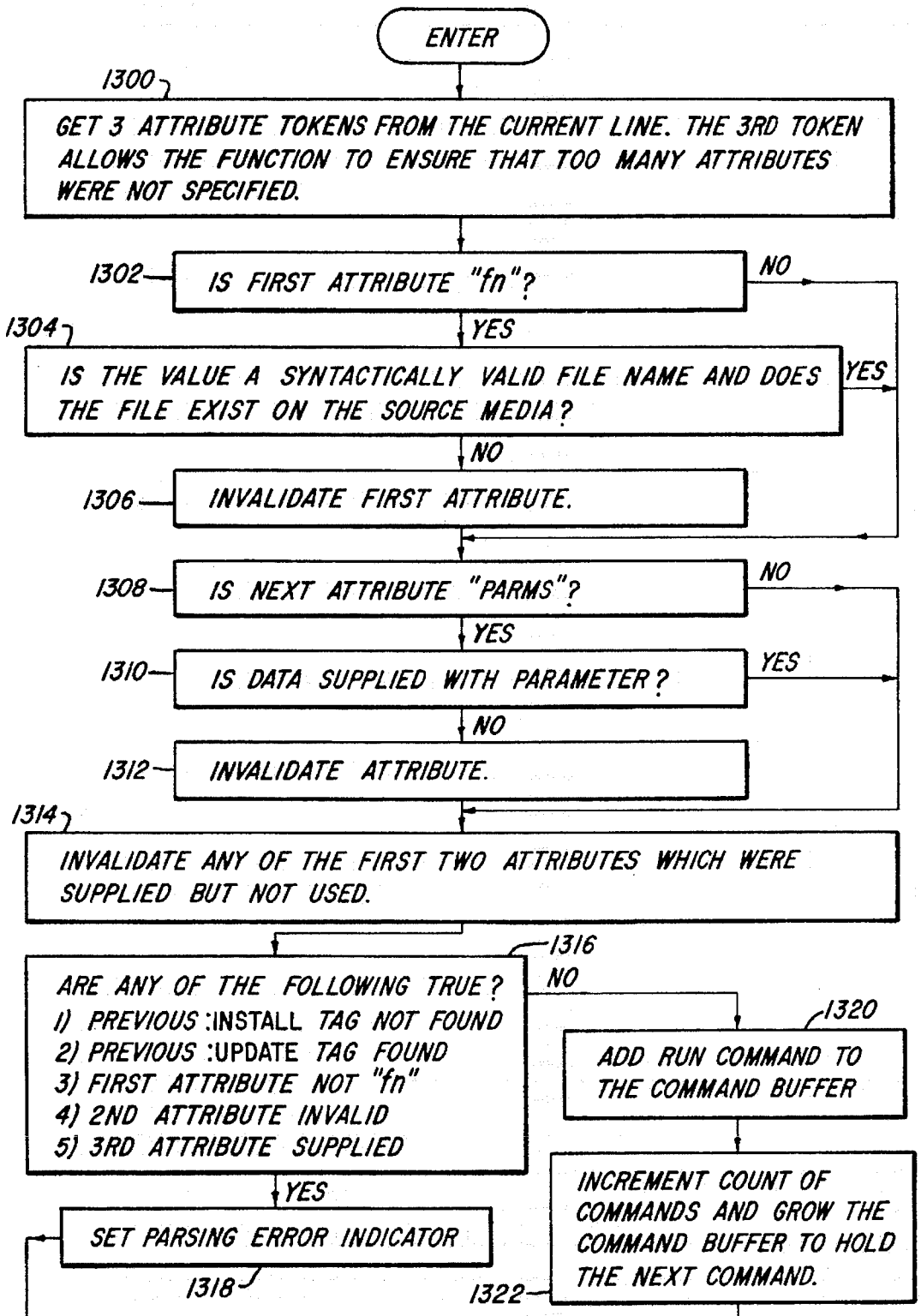
FIG. 14 is a logical flow chart illustrating a command specification for a functional tag utilized to implement the method and system of the present invention.

FIG. 14 illustrates the command function relating to the parse run function invoked by the tag :RUN. The tag is used to specify that a program, named by the tag and required by the program to be present on the drive on which the installation data profile file was found, be run. The process is entered at step 1300 with recovery of three attribute tokens from the current line. At step 1302, it is determined if the first attribute relates to file name and if so whether the value specified is a syntactically valid file name and whether the file exists on the source media. If either condition fails, the first attribute is invalided. Next, step 1308 is executed to determine if the next attribute relates to parameters. If YES, at step 1310, it is determined if data is supplied with the parameter and, if not, the attribute is invalidated. At step 1314, either attribute is invalidated if supplied but not provided with a value. Next, at step 1316, semantic and syntactic analysis is performed on the line to make sure that all conditions for its use have been met. If the appropriate conditions are not met, the parsing error indicator is set at step 1318. If use of the tag is appropriate, steps 1320 and 1322 are executed to modify the command buffer appropriately.

Figure 15:
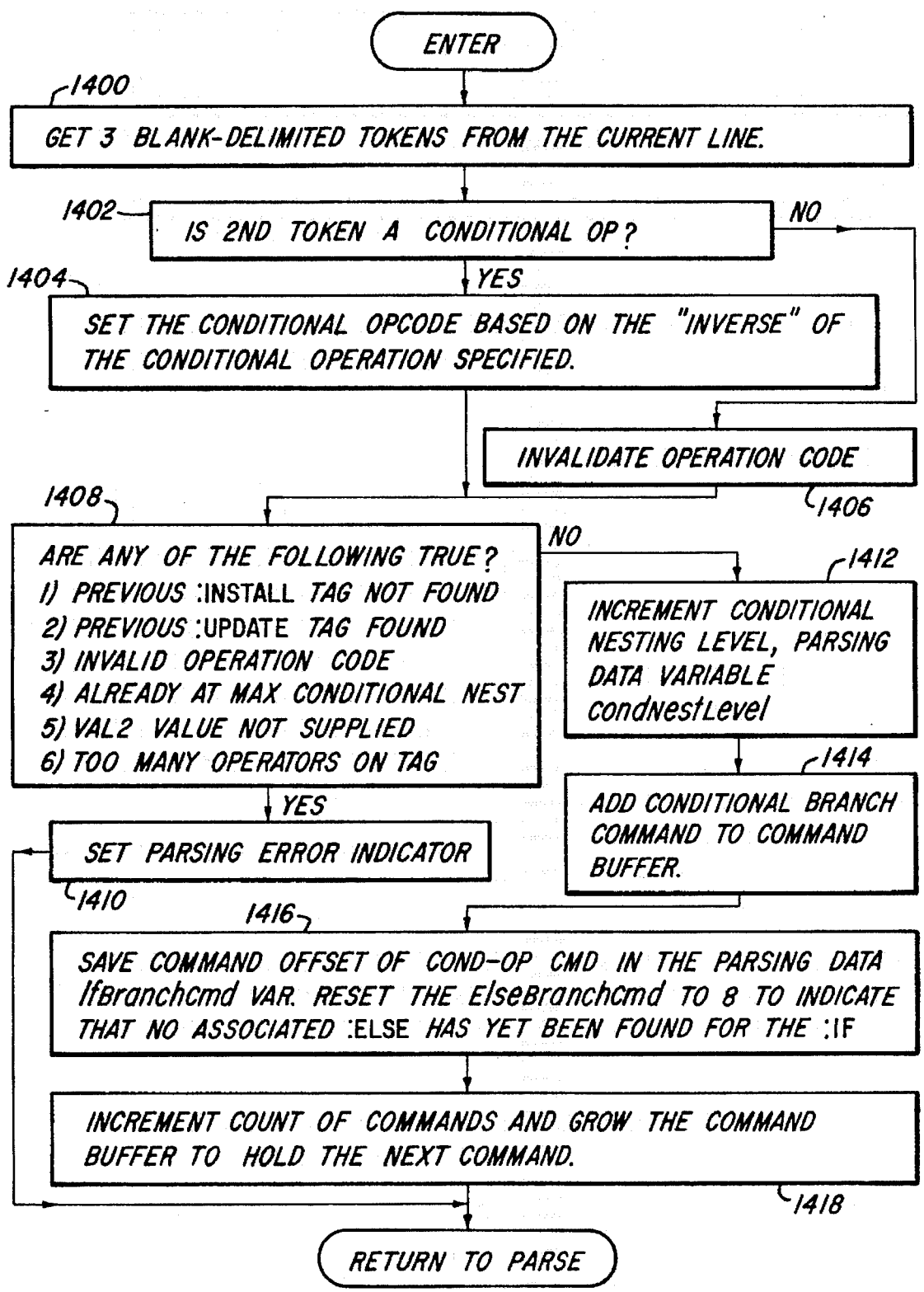
FIG. 15 is a logical flow chart illustrating a command specification for a functional tag utilized to implement the method and system of the present invention.

FIG. 15 depicts a logical flowchart relating to a command function invoked by occurrence of the tag :IF, which is named ParseIf. The :IF, :ELSE and :EIF tags provide conditional processing support in the language. Up to six levels of conditional nesting are allowed. When an :IF tag is located, all tags up to the next :ELSE or :EIF tag (whichever comes first) are executed unless the condition specified is false. If the condition is false, the interpreter will be required to branch the next command in the sequence.

The process is entered at step 1400 with recovery of three tokens from the current line. At step 1402 it is determined if the second token is a conditional operation. If it is not, step 1406 is executed to invalidate the operation code. If the token is a conditional operation, step 1404 is executed to set the conditional operation code based upon the inverse of the conditional operation specified. Next, at step 1408, syntactic analysis is performed on the tag and its attribute value tokens. Conditions for valid use include: previous occurrence of the :INSTALL and :UPDATE tags; absence of any invalid operation code; avoidance of exceeding the maximum conditional nesting allowed; and absence of too many attributes associated with the tag and supplying of a value for the second attribute. Any syntax error results in a set of the parsing error indicator and immediate return to the parse routine. Absence of error results in an incrementation of the current conditional nesting level (steps 1412 and 1414). The addition of a conditional branch command to the command buffer, setting of appropriate flags and counters respecting occurrence of the :ELSE and functions and modification of the command buffer appropriate occurs at steps 1416 and 1418.

Figure 16:
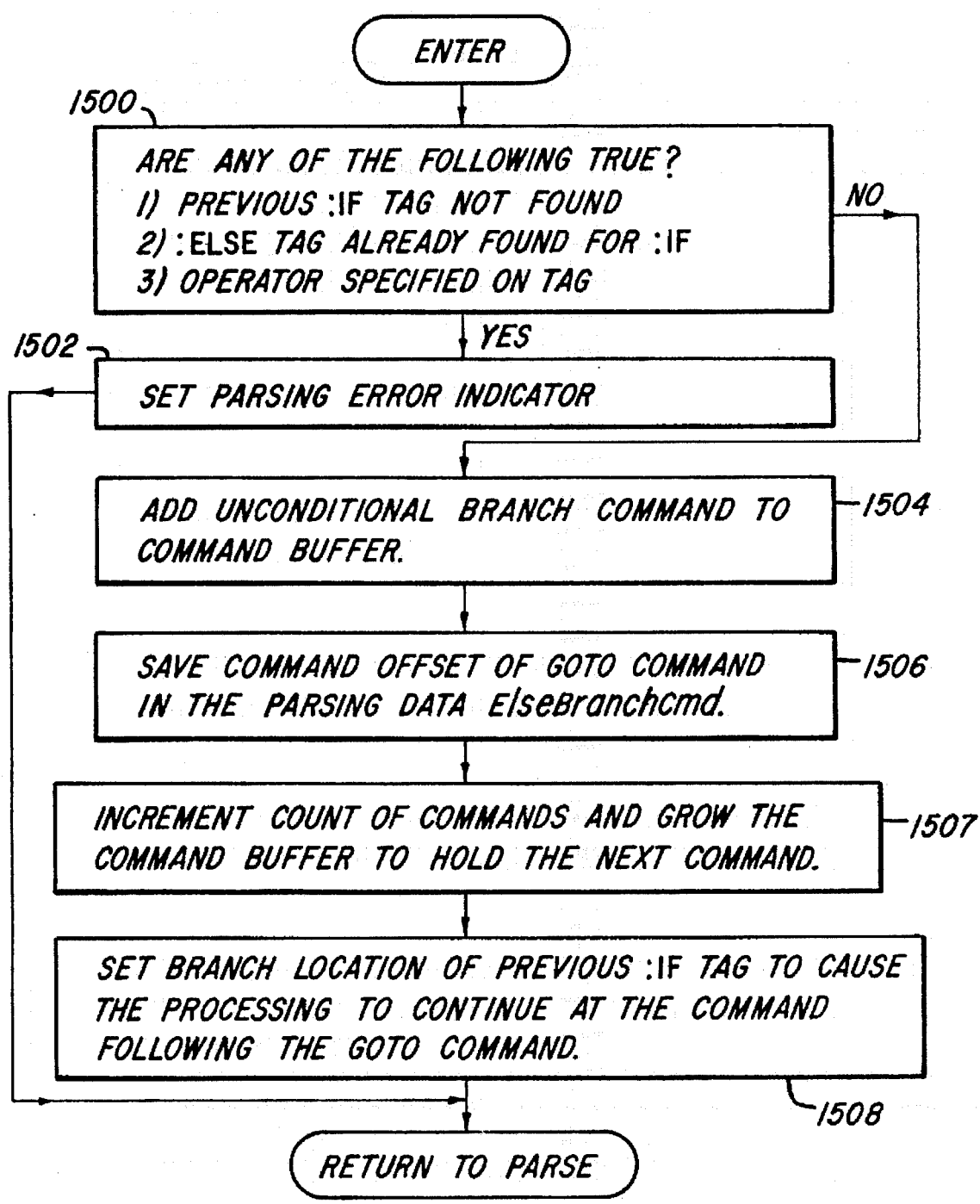
FIG. 16 is a logical flow chart illustrating a command specification for a functional tag utilized to implement the method and system of the present invention.

FIG. 16 illustrates the command function ParseElse invokes by occurrence of the :ELSE tag in an installation data profile file. The function is responsible for concluding the branch associated with an :IF tag. The :ELSE tag stops conditional processing provided by the previous :IF tag. The process is entered at step 1500 with syntactic analysis which essentially assures that the current :ELSE tag is associated with one and only one :IF tag and that an appropriate operator has been specified with the tag. Failure of any condition results in the set of a parsing error indicator at step 1502. Appropriate use of the tag results in the addition of an unconditional branch command to the command buffer at step 1504, inclusion of an appropriate GO TO command in the parse data at step 1506, and appropriate modification of the command buffer at step 1507. Step 1508 relates to the setting of a branch location of the previous :IF tag.

Figure 17:
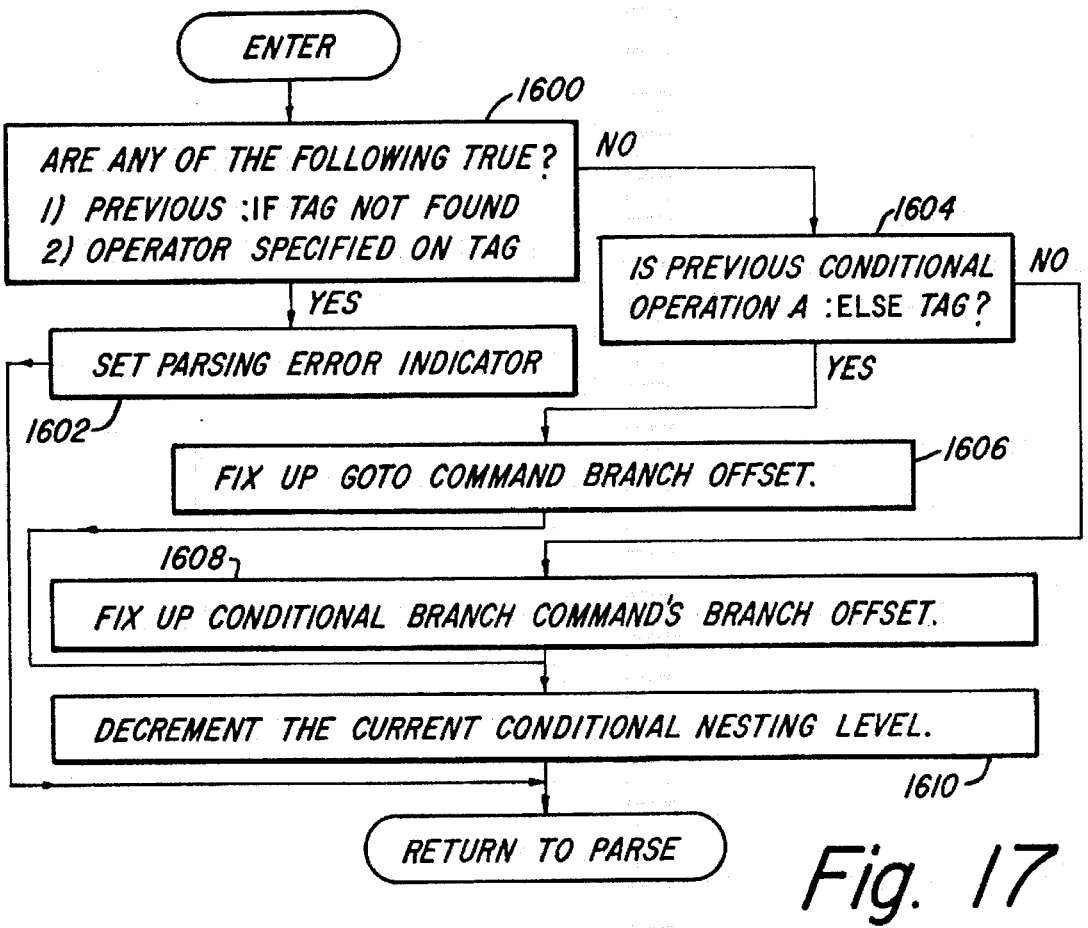
FIG. 17 is a logical flow chart illustrating a command specification for a functional tag utilized to implement the method and system of the present invention.

FIG. 17 depicts a command function for a ParseEndIf function invoked by the :EIF tag in the installation data profile. The :EIF tag adds no command to the command buffer but rather serves to delimit a conditional processing section. The process is entered at step 1600 for immediate determination of appropriate syntactic and semantic use. Essentially the :EIF tag must be associated with a prior :IF tag. Error is handled at step 1602. At step 1604, it is determined if the previous conditional operation was based on a :ELSE tag. If YES, step 1606 is executed to fix a "GO TO command branch offset". Step 1610 is executed to decrement the current conditional nesting level. If the previous conditional operation was not a :ELSE tag, step 1608 is executed to fix a "conditional branch commands branch offset" prior to decrementation of the current conditional nesting level.

Figure 18:
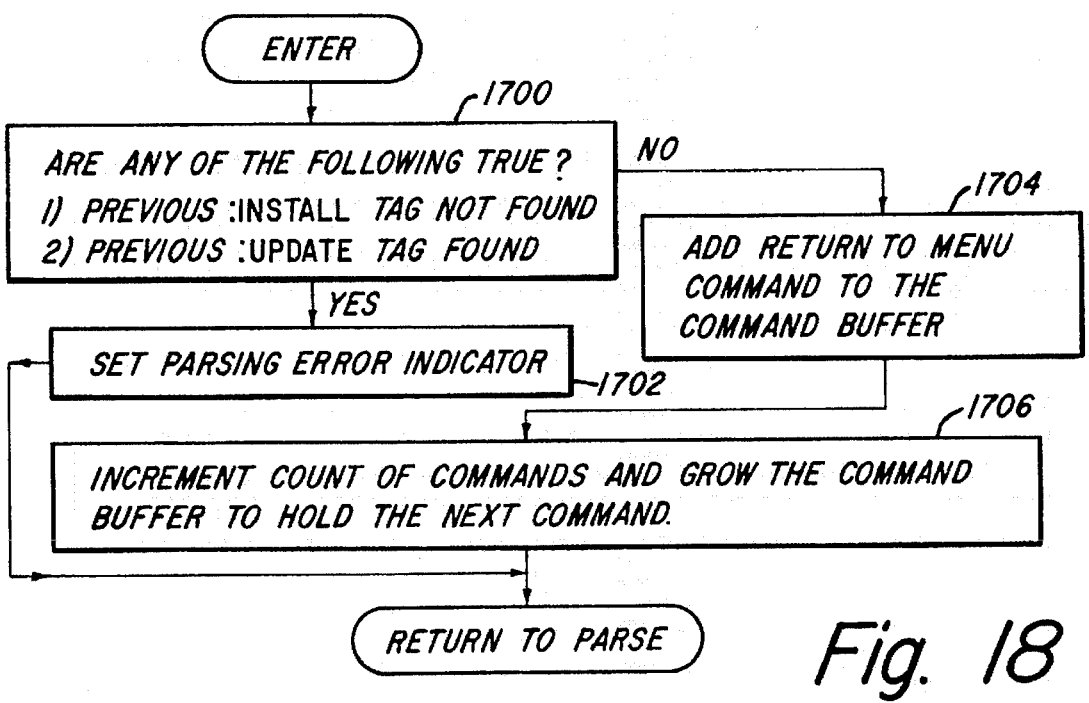
FIG. 18 is a logical flow chart illustrating a command specification for a functional tag utilized to implement the method and system of the present invention.

FIG. 18 illustrates a command function entitled ParseCancel invoked upon occurrence of the tag :CANCEL in an installation data profile. Occurrence of the tag is used to cancel an installation and is intended for use particularly within conditional processing sections. Step 1700 relates to syntactic analysis again relating to occurrence of an :INSTALL tag or absence of an :UPDATE tag. If no installation tag is present or an :UPDATE tag is present, a parsing error indicator is set (step 1702) indicating an inappropriate syntactic use of the tag. Otherwise, a return to menu command is added to the command buffer at step 1704 and the buffer is modified appropriately to handle the line at step 1706.

Installation information, such as the drive letter to which the installation is to be performed, is communicated from one command function routine to another through macros. One macro relates to dissemination of the installation target, including the drive and path which the installation is to be performed. When a user selects an installation option, the program displays a window for the user to specify the installation target drive based on the "choose" attribute of the :INSTALL tag. This sets the disk drive value in each of the drive macro values. The path value entered is set in each of six path macro values. The user specifies the installation target only once and the remaining installation data profile tags make use of this one input.

Some installations require a source file to be copied to the target drive, replacing an existing file on that drive in whatever directory the files happens to exist. When the installation uses a :COPY tag with the "locate" attribute, the program first tries to locate the named file on the target drive. If the file is found in any directory on the target drive, the program copies the source file to that directory overriding the existing file. Otherwise, the program copies the source file to the location specified by the "path" attribute of the :COPY tag. In either case, the program sets the path macro specified by the attribute to contain the path value to which the file was actually copied. These macro values can be used in :TXT tags to ensure that updated files with reflect the drive/path values to which the required files were copies.

One macro allows control within help windows for forcing a new page of help text. Another macro allows an installation "script" to require a file to be updated with information using the :TXT tag. Yet another macro saves the return code from either a message display or the return code of a program which was called by a :RUN tag. Another macro contains a symbolic name of the operating system that is installed on the target drive. This allows a single IDP file to be developed for both OS/2 and DOS device drive installations.

All default textual information displayed by the general installation utility will exist within a separate code module, allowing that information to be provided in various languages.

While the invention has been particularly shown and described with reference to a preferred embodiment, it will be understood by those skilled in the art that various changes in form and detail may be made therein without departing from the spirit and scope of the invention.

What is claimed is:

1. A method of installing device drivers or utility programs on a data processing system having at least one processor, a memory, a first auxiliary memory unit, a second auxiliary memory unit and an operating system for controlling the processor, the memory and the first and second auxiliary memory units, the method comprising the data processing system implemented steps of:

defining within said data processing system a plurality of predetermined command specifications relating to installation operations for the device drivers or the utility programs;

automatically identifying installation programs on the second auxiliary memory unit having statement instances invoking selected command specifications;

automatically building a list of the identified installation programs within said data processing system;

executing the selected command specifications invoked by the statement instances within said data processing system to generate interpretable code for the installation programs;

interpreting the interpretable code;

executing the installation programs;

displaying at least a first textual display requesting a user input relating to installation operations provided by an installation program; and automatically installing device drivers or utility programs within said data processing system utilizing said installation programs and said user input.

2. A method of installing device drivers or utility programs on a data processing system as set forth in claim 1, the method further comprising the steps of:

returning a count of valid installation programs from a source;

returning a count of installation programs from the source; and aborting execution of installation programs where the count of valid installation programs is zero or where the count of installation programs is zero.

3. A method of installing device drivers or utility programs on a data processing system as set forth in claim 1, the method further comprising the steps of:

recognizing operating system types on an installation target auxiliary memory unit;

recognizing specification of operating system types for installation programs; and responsive to concurrence of at least a first operating system type and of specification of at least a first operating system type, allowing installation on the installation target auxiliary memory unit of an operating system type specific device driver or utility program utilizing said installation programs.

4. A method of installing device drivers or utility programs on a data processing system is set forth in claim 1, the method further comprising:

automatically creating installation programs utilizing statement instances invoking the defined command specifications.

5. A method of installing device drivers or utility programs on a data processing system as set forth in claim 4, the method further comprising:

presenting a user with a common installation interface for a plurality of installation programs recognized as created utilizing statement instances invoking the command specifications.

6. A method of installing device drivers or utility programs on a data processing system as set forth in claim 5, wherein the step of displaying at least a first textual display includes:

writing national language help text in a plurality of language specific code modules; and identifying a selected language specific code module for utilization in the display of said first textual display during installation.

7. A method of installing device drivers or utility programs on a data processing system as set forth in claim 1, wherein the installation programs are named utilizing a uniform file extension.

* * * * *